(12) United States Patent
Hashimoto et al.

(10) Patent No.: US 10,594,182 B2
(45) Date of Patent: Mar. 17, 2020

(54) STATOR MANUFACTURING METHOD AND STATOR

(71) Applicant: AISIN AW CO., LTD., Anjo-shi, Aichi-ken (JP)

(72) Inventors: Shingo Hashimoto, Okazaki (JP); Shingo Sato, Okazaki (JP); Masaki Saito, Okazaki (JP); Kiyotaka Koga, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 365 days.

(21) Appl. No.: 15/323,008

(22) PCT Filed: Aug. 7, 2015

(86) PCT No.: PCT/JP2015/072566
§ 371 (c)(1),
(2) Date: Dec. 29, 2016

(87) PCT Pub. No.: WO2016/024554
PCT Pub. Date: Feb. 18, 2016

(65) Prior Publication Data
US 2017/0141632 A1 May 18, 2017

(30) Foreign Application Priority Data

Aug. 11, 2014 (JP) ................. 2014-163902
Jun. 12, 2015 (JP) ................. 2015-119214

(51) Int. Cl.
*H02K 3/12* (2006.01)
*H02K 15/085* (2006.01)
(Continued)

(52) U.S. Cl.
CPC ............ *H02K 3/12* (2013.01); *H02K 1/145* (2013.01); *H02K 3/04* (2013.01); *H02K 15/04* (2013.01);
(Continued)

(58) Field of Classification Search
CPC .. H02K 3/28; H02K 3/04; H02K 3/12; H02K 15/0435; H02K 15/06; H02K 15/066
See application file for complete search history.

(56) References Cited

U.S. PATENT DOCUMENTS

2010/0207466 A1 8/2010 Endo et al.
2012/0112595 A1 5/2012 Watanabe et al.
(Continued)

FOREIGN PATENT DOCUMENTS

CN 102577035 A 7/2012
EP 2 696 476 A1 2/2014
(Continued)

OTHER PUBLICATIONS

Aug. 25, 2017 Supplementary European Search Report issued in European Patent Application No. 15832281.8.
(Continued)

*Primary Examiner* — Jue Zhang
(74) *Attorney, Agent, or Firm* — Oliff PLC

(57) ABSTRACT

A stator manufacturing method that includes a lead wire bending process of inserting a plurality of concentrically wound coils into slots, each of the concentrically wound coils being formed by winding a flat conductive wire for a plurality of turns, each of the slots being formed between every two adjacent teeth extending radially inward from an annular back yoke of a stator core, and bending lead wire portions of the inserted concentrically wound coils projecting in an axial direction from an end surface of the stator core, and a second bending process of bending the lead wire portions using the connection parts as fulcrums so that the lead wire portions approach the end surface of the stator core along the circumferential direction of the stator core after the first bending process.

13 Claims, 19 Drawing Sheets

(51) Int. Cl.
    *H02K 3/04*         (2006.01)
    *H02K 15/04*      (2006.01)
    *H02K 1/14*        (2006.01)

(52) U.S. Cl.
    CPC ....... *H02K 15/0435* (2013.01); *H02K 15/085* (2013.01)

(56) References Cited

U.S. PATENT DOCUMENTS

| | | | |
|---|---|---|---|
| 2012/0217836 A1* | 8/2012 | Watanabe | H02K 3/12 310/207 |
| 2013/0000105 A1 | 1/2013 | Hasegawa et al. | |
| 2014/0015367 A1 | 1/2014 | Umehara et al. | |
| 2014/0021823 A1* | 1/2014 | Kitamura | H02K 3/14 310/208 |
| 2015/0155750 A1 | 4/2015 | Hashimoto et al. | |

FOREIGN PATENT DOCUMENTS

| | | |
|---|---|---|
| JP | 2011-193597 A | 9/2011 |
| JP | 2012-125043 A | 6/2012 |
| JP | 2012-249344 A | 12/2012 |
| JP | 2013-005541 A | 1/2013 |
| JP | 2013005541 A * | 1/2013 |
| JP | 2013-172575 A | 9/2013 |
| WO | 2012/137273 A1 | 10/2012 |
| WO | 2013/190894 A1 | 12/2013 |

OTHER PUBLICATIONS

Nov. 2, 2015 International Search Report issued in International Patent Application No. PCT/JP2015/072566.

Sep. 6, 2016 Search Report issued in International Patent Application No. PCT/JP2016/066987.

Mar. 27, 2018 Search Report issued in European Patent Application No. 16807494.6.

U.S. Appl. No. 15/563,230, filed Sep. 29, 2017 in the name of. Shingo Hashimoto et al.

* cited by examiner

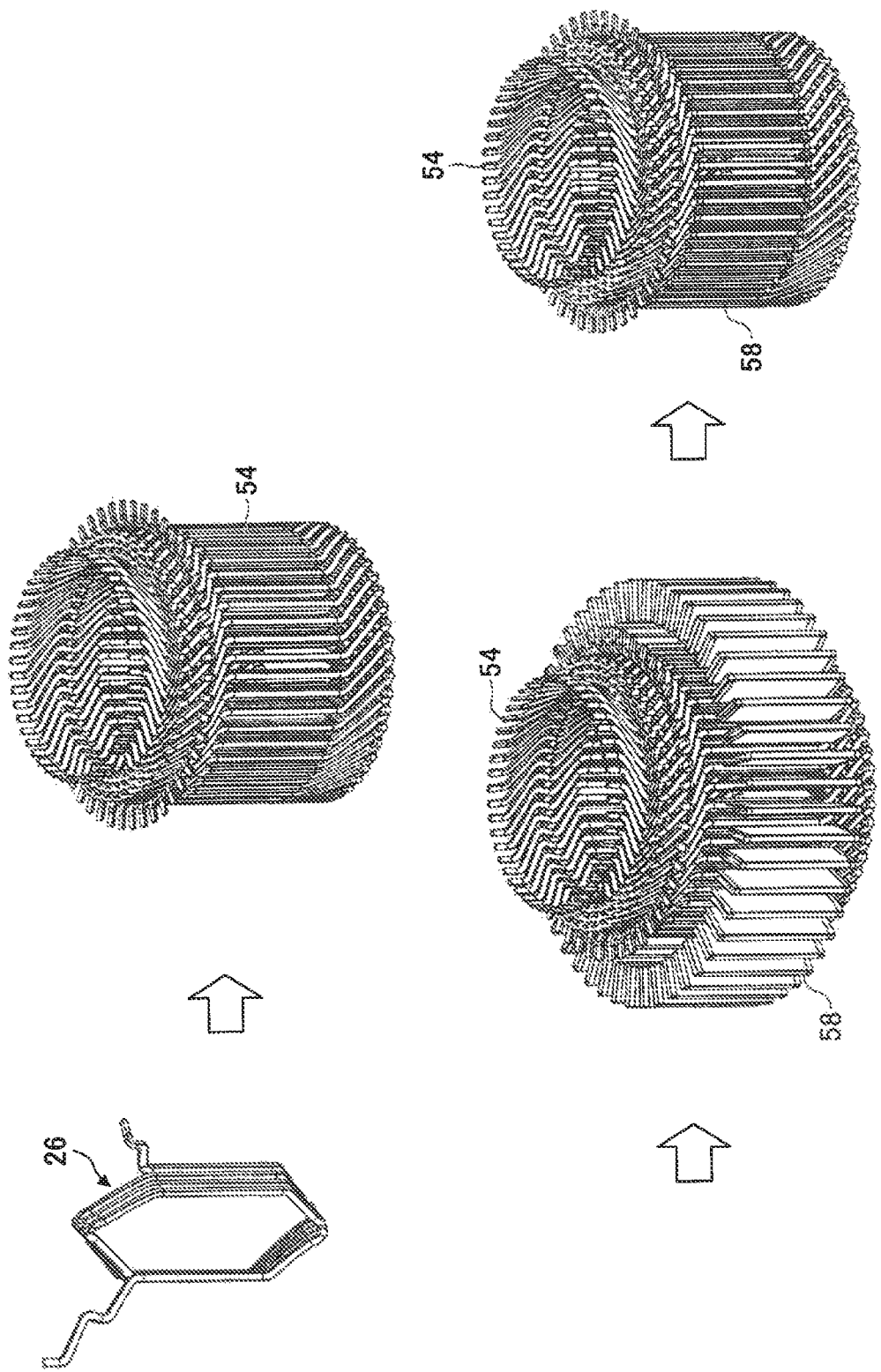

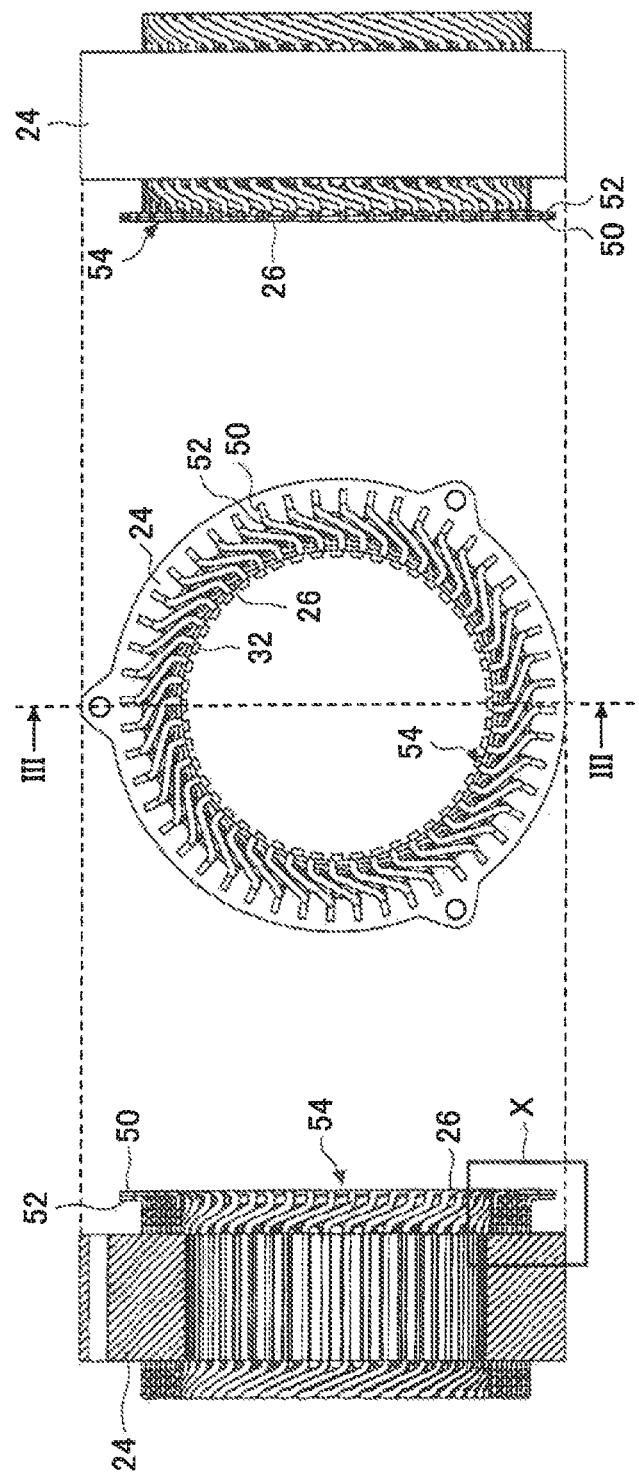

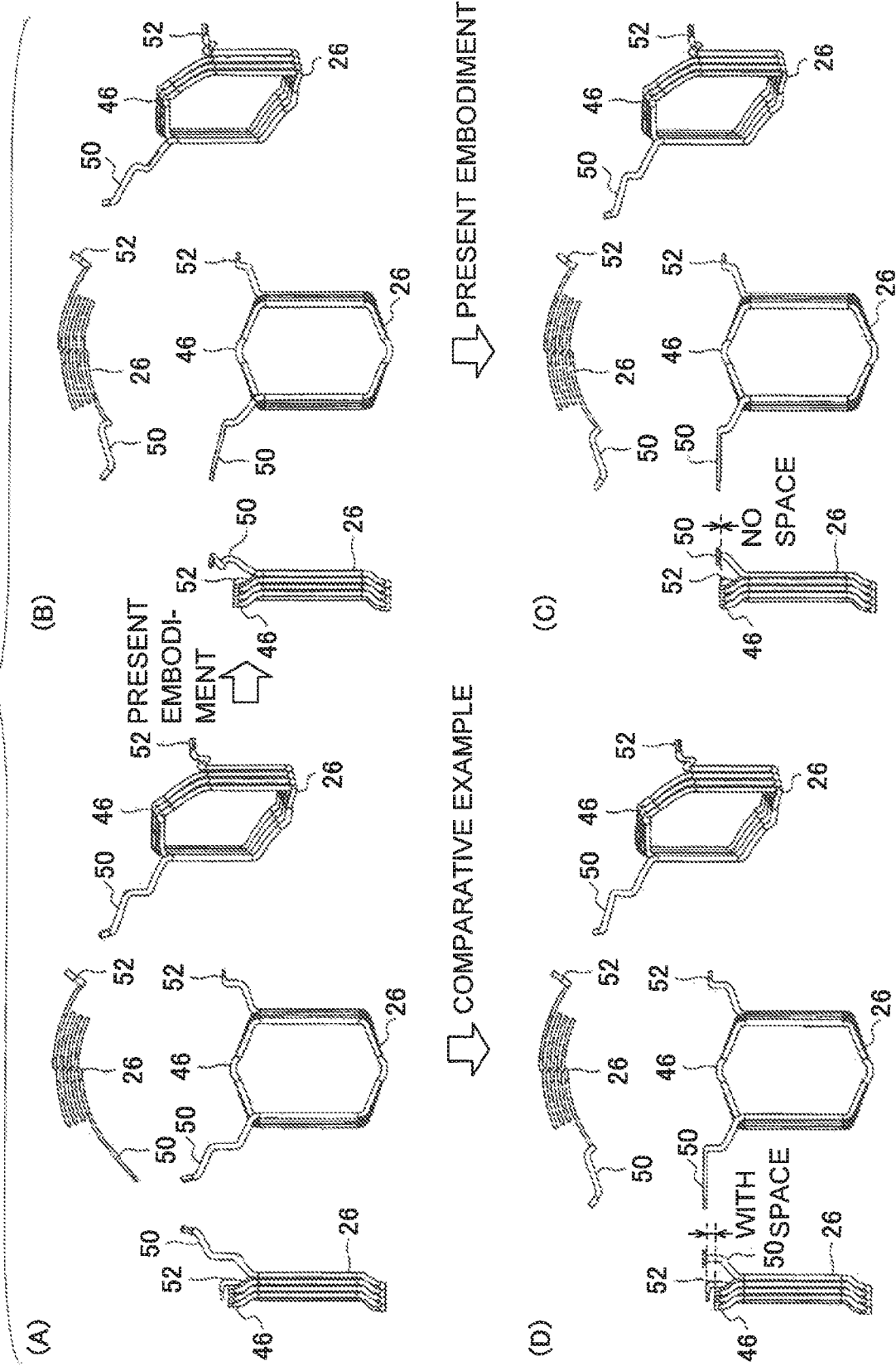

STATOR MANUFACTURING METHOD AND STATOR

BACKGROUND

The present disclosure relates to a stator manufacturing method and a stator.

There is known a stator manufacturing method and stator manufacturing apparatus for manufacturing a stator including a stator core and coils (see JP-A-2013-172575, for example). In the method and apparatus described in JP-A-2013-172575, the lead wire portions of coils formed by flat conductors are bent, the lead wire portions projecting in the axial direction from the end surface of the stator core. The lead wire portion of each coil is connected by welding or the like to the lead wire portion of another coil apart from the coil by a predetermined distance in the circumferential direction.

SUMMARY

However, in the above method and apparatus described in JP-A-2013-172575, the ends of the lead wire portions of the coils are oriented in the axial direction of the stator. Accordingly, the lead wire portions of the stator coils are connected to each other in positions away from the end surface of the stator core and the dimension in the axial direction of the entire stator becomes large.

In contrast, when the lead wire portions of the coils are connected to each other in the state in which both parts are oriented in the radial direction, the dimension in the axial direction of the entire stator can be reduced (see JP-A-2012-125043, for example). However, when the lead wire portions on the inner diameter side are bent (bent flatwise) radially outward across the coil end portions after the coils are attached to the stator core, it is necessary to dispose a bending fulcrum jig between the vertex portions of the coil end portions and the bent portions obtained by bending the lead wire portions and bend the coils at the positions more distant in the axial direction from the stator core than vertex portions. Accordingly, even after the bending fulcrum jig is removed (that is, after flatwise bending), the space for the dimension of the jig remains between the vertex portions of the coil end portions and the bent portions obtained by bending of the lead wire portions, thereby increasing the dimension in the axial direction of the entire stator by the dimension of the jig.

An exemplary aspect of the present disclosure provides a stator manufacturing method and a stator capable of reducing the dimension in the axial direction of the stator.

According to an exemplary aspect of the disclosure, there is provided a stator manufacturing method including a lead wire bending process of inserting a plurality of concentrically wound coils into slots, each of the concentrically wound coils being formed by winding a flat conductive wire for a plurality of turns, each of the slots being formed between every two adjacent teeth extending radially inward from an annular back yoke of a stator core, and bending lead wire portions of the inserted concentrically wound coils projecting in an axial direction from an end surface of the stator core, in which the lead wire portions before being bent in the lead wire bending process extend in a circumferential direction while extending in the axial direction and the lead wire bending process includes a first bending process of bending the lead wire portions using, as fulcrums, predetermined parts between connection parts between the lead wire portions and slot accommodation portions of the concentrically wound coils and ends of the lead wire portions, the slot accommodation portions being accommodated in the slots, so that parts positioned closer to the ends than the predetermined parts topple radially outward and a second bending process of bending the lead wire portions using the connection parts as fulcrums so that the lead wire portions approach the end surface of the stator core along the circumferential direction of the stator core after the first bending process.

According to another aspect of the disclosure, there is provided a stator including an annular stator core having a plurality of slots and a coil assembly having a plurality of coils to be inserted into the plurality of slots, in which the coil assembly includes coil end portions projecting from end surfaces in directions along a rotary axis of the stator core, the coil end portions include a plurality of vertex portions projecting outward in the directions along the rotary axis, the vertex portions being provided adjacently to each other in a circumferential direction and a plurality of lead wire portions supplying electric power to the coils, each of the plurality of lead wire portions has a bent portion bent radially outward from radially inward of the stator core and end side portions extending toward an end from the bent portion, and a bending start point of the bent portion is disposed so as to overlap with the vertex portions as seen from a radial direction and the end side portions are disposed parallel to the end surfaces of the stator core.

According to an exemplary aspect of the disclosure, a stator manufacturing method capable of reducing the dimension in the axial direction of the stator can be obtained. In addition, according to another exemplary aspect of the disclosure, a stator having a reduced dimension in the axial direction can be obtained.

BRIEF DESCRIPTION OF THE DRAWINGS

Embodiments will be described below with reference to the drawings.

FIG. 4 illustrates an example of the procedure for forming a coil assembly shaped like an annular cage using a plurality of concentrically wound coils in the embodiment.

FIG. 11B is a three-plane view illustrating the state after bending the lead wire portions of the concentrically wound coils using the post-process jig in the stator manufacturing method and the stator manufacturing apparatus according to the embodiment.

FIG. 13 illustrates effects obtained when the lead wire portions of the concentrically wound coils are bent in the stator manufacturing method and the stator manufacturing apparatus according to the embodiment.

DETAILED DESCRIPTION OF EMBODIMENTS

Figure 1:
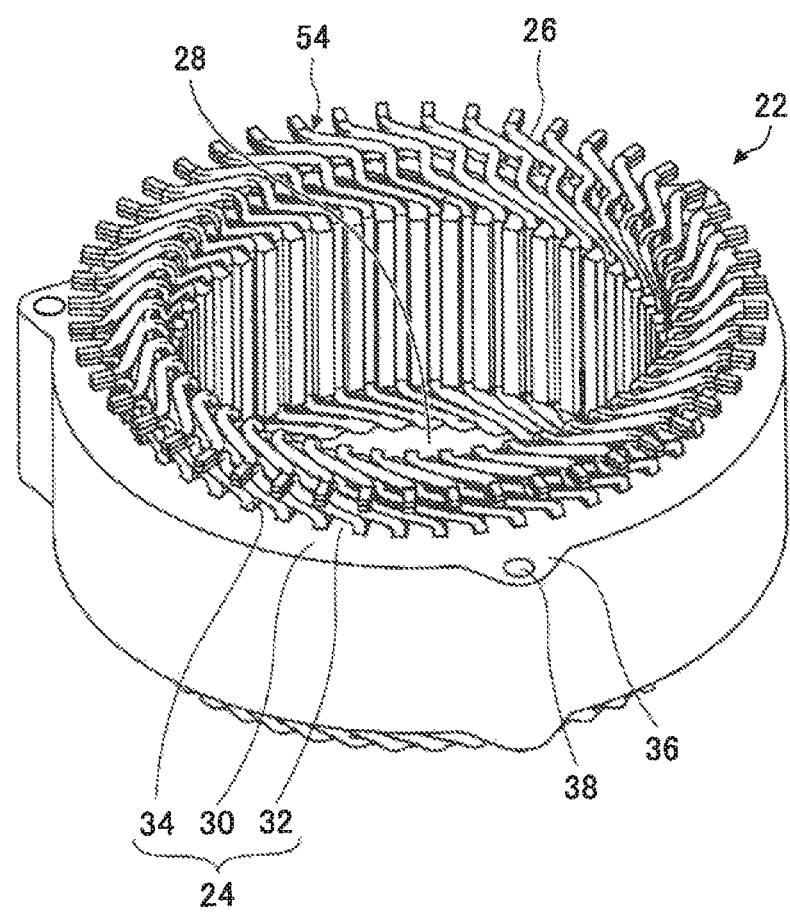
FIG. 1 is a perspective view illustrating a stator manufactured by a stator manufacturing method and a stator manufacturing apparatus according to an embodiment of the disclosure.
Figure 2:
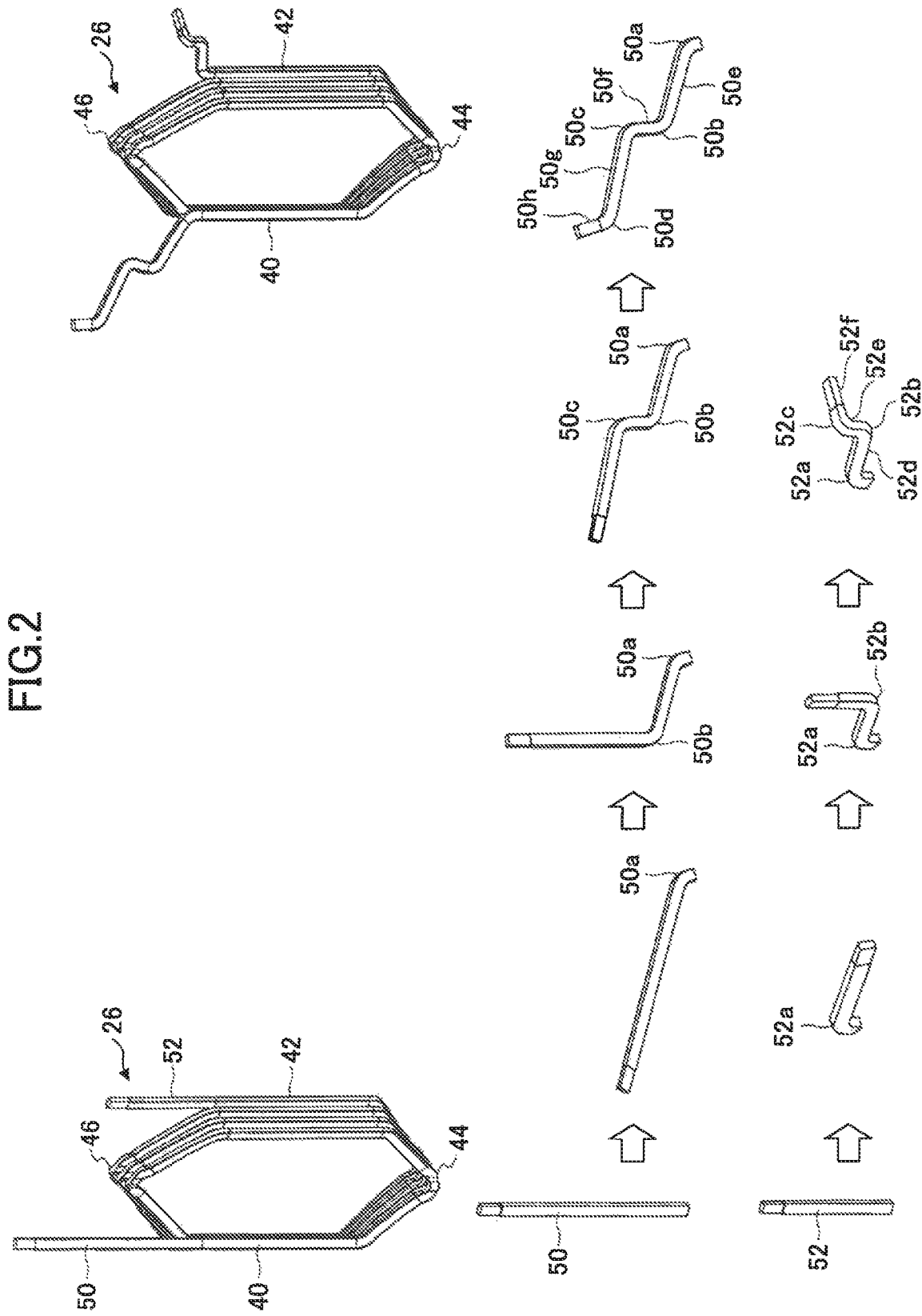
FIG. 2 illustrates an example of the procedure for bending the lead wire portions of a concentrically wound coil before manufacturing a stator by the stator manufacturing method and the stator manufacturing apparatus according to the embodiment.
Figure 3A:
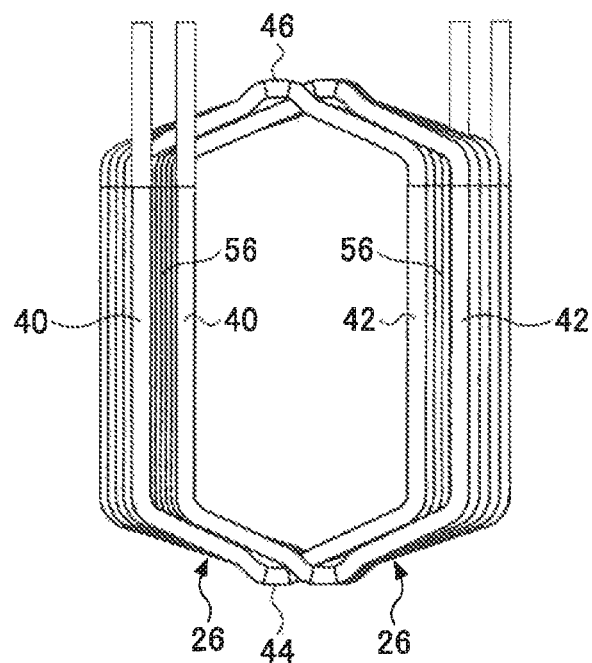
FIG. 3A illustrates the positional relationship between two concentrically wound coils adjacent to each other in the circumferential direction in the embodiment.
Figure 3B:
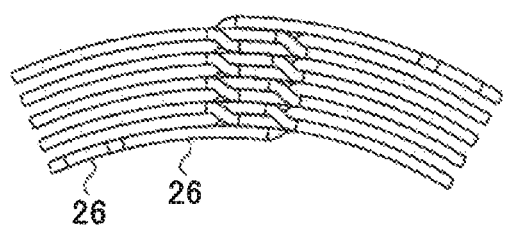
FIG. 3B illustrates the positional relationship between the two concentrically wound coils adjacent to each other in the circumferential direction in the embodiment.

FIG. 1 is the perspective view illustrating the stator manufactured by the stator manufacturing method and the stator manufacturing apparatus according to the embodiment of the disclosure. FIG. 2 illustrates an example of the procedure for bending the lead wire portion of the concentrically wound coil before manufacturing the stator by the stator manufacturing method and the stator manufacturing apparatus according to the embodiment. FIG. 3A and FIG. 3B illustrate the positional relationship between two concentrically wound coils adjacent to each other in the circumferential direction in the embodiment. FIG. 3A is a view seen from the center of the axis and FIG. 3B is a view seen from the axial direction. In addition, FIG. 4 illustrates an example of the procedure for forming a coil assembly shaped like an annular cage using a plurality of concentrically wound coils in the embodiment.

A stator manufacturing apparatus 20 according to the embodiment manufactures a stator 22 that is a stator used for a rotary electric machine such as, for example, a three-phase AC motor. The stator 22 is a member, disposed radially outward of a rotor with a predetermined air gap, that generates a magnetic field for rotating the rotor by energization. The stator 22 includes a stator core 24 and a stator coil 26.

The stator core 24 is a member formed in a hollow cylinder. A space (inner diameter side space) 28 for accommodating the rotor is formed on the inner diameter side of the stator core 24. The stator core 24 may be formed by laminating a plurality of insulation-coated electromagnetic steel plates in the axial direction. In addition, the radially outward end surface of the stator core 24 may be provided with a cylindrical yoke made of a material obtained by compression-molding insulation-coated soft magnetic powder.

The stator core 24 includes a back yoke 30 formed in an annular ring and teeth 32 extending radially inward (toward the axial center) from the radially inward end surface of the back yoke 30. The plurality of (for example, 48) teeth 32 are provided in the back yoke 30 at regular intervals in the circumferential direction. A slot 34 for holding the stator coil 26 is formed between the two teeth 32 adjacent to each other in the circumferential direction.

The stator core 24 is provided with ear portions 36 used to fix the stator 22 to the motor case. The ear portion 36 is formed in a mount projecting radially outward from the radially outward end surface (outer peripheral surface) of the body of the stator core 24 (specifically, the back yoke 30). The plurality of (for example, 3) ear portions 36 are provided distantly from each other in the circumferential direction. The ear portion 36 is provided with a through hole 38 penetrating through the ear portions 36 in the axial direction. The stator 22 is fixed to the motor case by tightening the bolts penetrating through the through holes 38 of the ear portions 36 using nuts.

In addition, the stator coil 26 is formed by a flat conductive wire having a quadrilateral (specifically, rectangular) cross section. This flat conductive wire is made of metal having a high conductivity, such as, for example, copper or aluminum. The corners of the rectangular cross section of the flat conductive wire may be rounded. The plurality of (for example, 48) stator coils 26 are provided for the stator core 24 in the circumferential direction.

Each of the stator coils 26 is a concentrically wound coil (cassette coil) formed by winding a flat conductive wire a predetermined number of (for example, five) turns and bending the wound flat conductive wire. The stator coil 26 is referred to below as the concentrically wound coil 26. The concentrically wound coil 26 is formed by winding one straight flat conductive wire for a predetermined number of turns while shaping the conductive wire in an ellipse using a winding formation apparatus and then bending the wound conductive wire in a substantially hexagon or substantially an octagon using a shaping apparatus.

The concentrically wound coil 26 has slot accommodation portions 40 and 42 and coil end portions 44 and 46. The slot accommodation portions 40 and 42 are accommodated in the slots 34 of the stator core 24 and extend substantially straight by penetrating through the slots 34 in the axial direction. In the single concentrically wound coil 26, the slot accommodation portion 40 and the slot accommodation portion 42 are accommodated in the different slots 34 apart from each other by a predetermined distance in the circumferential direction of the stator core 24. The coil end portions 44 and 46 are curved portions projecting outward in the axial direction from the end surface in the axial direction of the stator core 24 and connecting the two slot accommodation portions 40 and 42 apart from each other in the circumferential direction.

The concentrically wound coil 26 is configured so that a plurality of flat conductive wires are laminated in the short-side direction of the cross section of the flat conductive wire and a predetermined space is formed in the lamination direction in which the flat conductive wires are laminated between adjacent flat conductive wires. The concentrically wound coil 26 is formed to have a trapezoid cross section so that the separation distance (interval) between the two slot accommodation portions 40 and 42 changes depending on the position in the lamination direction. The trapezoid cross section is formed so that the slot accommodation portions 40 and 42 of the concentrically wound coil 26 are appropriately accommodated in the slots 34. The concentrically wound coils 26 are assembled to the stator core 24 so that the lamination direction of the flat conductive wires matches the radial direction orthogonal to the axial direction of the stator core 24.

The coil end portions 44 and 46 of the concentrically wound coil 26 are formed in a plurality of different non-linear shapes. Specifically, the coil end portions 44 and 46 are formed in, for example, three non-linear shapes: crank formation like a crank bent in steps toward the radial direction of the stator core 24, arc formation like an arc curved along the arc of the annular stator core 24, and edgewise formation like a knee bent in the longitudinal direction of the cross section of a flat conductive wire. Crank formation is bending performed for a lane change between the flat conductive wires in the lamination direction of the flat conductive wires. Arc formation is bending performed to efficiently accommodate the concentrically wound coils 26 in the slots 34. In addition, edgewise formation is bending performed to efficiently dispose the plurality of the concentrically wound coils 26.

The concentrically wound coil 26 has lead wire portions 50 and 52 at both ends of the flat conductive wire. The lead wire portion 50 is connected to the end of the slot accommodation portion 40 to be accommodated in the slot 34. The lead wire portion 52 is connected to the end of the slot accommodation portion 42 to be accommodated in the slot 34. The lead wire portions 50 and 52 project in the axial direction from the end surface in the axial direction of the stator core 24 when the slot accommodation portions 40 and 42 are accommodated in the slots 34 of the stator core 24. It is assumed that the lead wire portions 50 and 52 project in the axial direction on a coil end portion 46 side.

The lead wire portion 50 is an end portion positioned on the inner diameter side in the concentrically wound coil 26 formed by winding a flat conductive wire for a predetermined number of turns. The lead wire portion 52 is an end portion positioned on the outer diameter side in the concentrically wound coil 26. The lead wire portion 50 is referred to below as the inner diameter side lead wire portion 50 and the lead wire portion 52 is referred to below as the outer diameter side lead wire portion 52 as appropriate. Immediately after the concentrically wound coil 26 is bent in substantially a hexagon or substantially an octagon by the shaping apparatus, the lead wire portions 50 and 52 are formed so as to extend substantially linearly. If the concentrically wound coil 26 is attached to the stator core 24 and the slot accommodation portions 40 and 42 are accommodated in the slots 34 of the stator core 24, the lead wire portions 50 and 52 are formed so as to extend substantially linearly in the axial direction.

After the concentrically wound coil 26 is bent in substantially a hexagon or substantially an octagon by the shaping apparatus, the lead wire portions 50 and 52 are crooked and bent before a coil assembly 54 is configured by the plurality of the concentrically wound coils 26 as described later. After the coil assembly 54 is configured and then the concentrically wound coils 26 are inserted into the slots 34 of the stator core 24, the lead wire portions 50 and 52 are also crooked and bent as described later.

Specifically, before the coil assembly 54 is configured, as illustrated in FIG. 2, the inner diameter side lead wire portion 50 is first bent in a circumferentially outward direction (counterclockwise direction in FIG. 2) which is an edgewise direction of a flat conductive wire at a connection part 50a connecting to the slot accommodation portion 40, next bent in a circumferentially inward direction (clockwise direction in FIG. 2) which is the edgewise direction of the flat conductive wire at a connection part 50b positioned closer to the end than the bent portion 50a, then bent in the circumferentially outward direction (counterclockwise direction in FIG. 2) which is the edgewise direction of the flat conductive wire at a part 50c positioned closer to the end than the bent portion 50b, and finally bent in the circumferentially inward direction (clockwise direction in FIG. 2) which is the edgewise direction of the flat conductive wire at a portion 50d positioned closer to the end than the bent portion 50c. At this time, the bent portion 50a is bent at an angle smaller than the final desired angle with respect to the axial direction so that the inner diameter side lead wire portion 50 follows the circumferential direction in advance.

In addition, the outer diameter side lead wire portion 52 is first bent in the circumferentially outward direction (clockwise direction in FIG. 2) which is the edgewise direction of the flat conductive wire in a vicinity 52a of the connection part connecting to the slot accommodation portion 42, next bent in the circumferentially inward direction (counterclockwise direction in FIG. 2) which is the edgewise direction of the flat conductive wire at a part 52b positioned closer to the end than the bent portion 52a, and finally bent in the radially outward direction which is the flatwise direction of the flat conductive wire at a portion 52c positioned closer to the end than the bent portion 52b.

The positions and the degrees of bending of the bent portions 50a, 50b, 50c, and 50d of the inner diameter side lead wire portion 50 are set so according to the final desired shape of the concentrically wound coil 26. In addition, the positions and the degrees of bending of the bent portions 52a, 52b, and 52c of the outer diameter side lead wire portion 52 are set according to the final desired shape of the concentrically wound coil 26.

When bent as described above, the inner diameter side lead wire portion 50 includes an extending portion 50e extending from the bent portion 50a to the bent portion 50b, an extending portion 50f extending from the bent portion 50b to the bent portion 50c, an extending portion 50g extending from the bent portion 50c to the bent portion 50d, and an extending portion 50h extending from the bent portion 50*d* to the end. In addition, when bent as described above, the outer diameter side lead wire portion 52 includes an extending portion 52*d* extending from the bent portion 52*a* to the bent portion 52*b*, an extending portion 52*e* extending from the bent portion 52*b* to the bent portion 52*c*, and an extending portion 52*f* extending from the bent portion 52*c* to the end.

If the concentrically wound coil 26 is attached to the stator core 24 and the slot accommodation portions 40 and 42 are accommodated in the slots 34 of the stator core 24, the extending portion 50*e* of the inner diameter side lead wire portion 50 extends in the circumferentially outward direction while extending in the axial direction of the stator 22. In addition, the extending portion 50*f* extends substantially in the axial direction of the stator 22, the extending portion 50*g* extends in the circumferentially outward direction while extending in the axial direction of the stator 22, and the extending portion 50*h* extends substantially in the axial direction (may be inclined slightly in the circumferential direction) of the stator 22. Since the above bending is performed in the edgewise direction of the flat conductive wire, the extending portions 50*e*, 50*f*, 50*g*, and 50*h* are formed substantially concentrically after being bent as described above.

In addition, if the concentrically wound coil 26 is attached to the stator core 24 and the slot accommodation portions 40 and 42 are accommodated in the slots 34 of the stator core 24, the extending portion 52*d* of the outer diameter side lead wire portion 52 extends in the circumferentially outward direction while extending in the axial direction of the stator 22. In addition, the extending portion 52*e* extends substantially in the axial direction of the stator 22 and the extending portion 52*f* extends radially outward.

The plurality of concentrically wound coils 26 are disposed in the circumferential direction to configure the coil assembly 54 shaped like an annular cage. The coil assembly 54 is formed in an annular cage by crooking and bending the concentrically wound coils 26 as described above in the lead wire portions 50 and 52 and disposing the plurality of the concentrically wound coils 26 annularly in the circumferential direction. The coil assembly 54 is formed so as to achieve the following items (i) to (iii).

(i) Each of the plurality of the concentrically wound coils 26 is accommodated in the slots 34 of the stator core 24 in a state in which the concentrically wound coils 26 are displaced one by one in the circumferential direction (see FIG. 3A). (ii) The two concentrically wound coils 26 disposed adjacently to each other in the circumferential direction are assembled so that the flat conductive wires of individual stages are superposed alternately in the lamination direction (that is, the radial direction) (see FIG. 3B). (iii) The two concentrically wound coils 26 disposed apart from each other in the circumferential direction by a predetermined distance are assembled so that the flat conductive wires of the individual stages of the slot accommodation portion 40 of one coil 26 and the flat conductive wires of the individual stages of the slot accommodation portion 42 of the other coil 26 are arranged alternately in the lamination direction (that is, the radial direction) in the same slot 34. Upon completion of the assembly illustrated in (ii) above, tooth holes 56 in which the teeth 32 of the stator core 24 are inserted and disposed are formed between the slot accommodation portions 40 and 42 of the two concentrically wound coils 26 adjacent to each other in the circumferential direction of the coil assembly 54.

When the stator 22 is applied to, for example, a three-phase AC motor, the concentrically wound coils 26 constitute a U-phase coil, V-phase coil, or W-phase coil. For example, in the coil assembly 54, one polarity is formed by the six concentrically wound coils 26 arranged in the circumferential direction including two U-phase coils, two V-phase coils, and two W-phase coils, which are the concentrically wound coils 26, arranged in the circumferential direction.

The stator 22 also has an insulation member 58 for ensuring electric insulation between the stator core 24 and the concentrically wound coils 26. The insulation member 58 is a slot cell that has the shape corresponding to the slot 34 of the stator core 24, is attached to each of the slots 34, and has a U-shaped cross section. The insulation member 58 is a thin film member made of paper or resin (such as, for example, thermoset resin or thermoplastic resin). After the coil assembly 54 including a predetermined number of the concentrically wound coils 26 is formed as illustrated in FIG. 4, the insulation member 58 is attached to the coil assembly 54 by inserting the insulation member 58 into the slot accommodation portions 40 and 42 of the concentrically wound coils 26 from the outer diameter side to the inner diameter side of the slot accommodation portions 40 and 42.

Next, the procedure for manufacturing the stator 22 in the embodiment will be described.

In the embodiment, the stator 22 is assembled by attaching the concentrically wound coils 26 of the coil assembly 54 to the stator core 24, that is, by inserting the slot accommodation portions 40 and 42 of the concentrically wound coils 26 into the slots 34 of the stator core 24.

In the coil assembly 54, before the slot accommodation portions 40 and 42 of the concentrically wound coil 26 are inserted into the slots 34 of the stator core 24, the separation distance (interval) between the two slot accommodation portions 40 and 42 of the concentrically wound coil 26 is smaller than after the slot accommodation portions 40 and 42 are inserted into the slots 34, so the length in the axial direction (specifically, the distance between the end in the axial direction of the coil end portion 44 and the end in the axial direction of the coil end portion 46) is larger and the outer diameter is smaller (specifically, the outer diameter is slightly smaller than the inner diameter of the teeth 32 of the stator core 24). For convenience sake, the coil assembly 54 before the slot accommodation portions 40 and 42 are inserted into the slots 34 of the stator core 24 is referred to as the initial coil assembly 54 and the coil assembly 54 after the slot accommodation portions 40 and 42 are inserted into the slots 34 of the stator core 24 is referred to as the inserted coil assembly 54.

In the embodiment, the initial coil assembly 54 and the stator core 24 are prepared. The initial coil assembly 54 includes the plurality of the concentrically wound coils 26 disposed annularly, each of the concentrically wound coils 26 having the extending portions 50*e*, 50*f*, 50*g*, and 50*h* formed substantially concentrically, and the insulation member 58 attached to the slot accommodation portions 40 and 42 of the concentrically wound coils 26. As described above, the initial coil assembly 54 is configured to have an outer diameter slightly smaller than the inner diameter of the teeth 32 of the stator core 24. First, the stator core 24 is assembled to the initial coil assembly 54 so that the initial coil assembly 54 is inserted into the inner diameter side space 28 from the axial direction of a coil end portion 44 side on which the lead wire portions 50 and 52 of the concentrically wound coils 26 are not provided. When this assembly is performed, the initial coil assembly 54 is disposed in the inner diameter side space 28 of the stator core 24.

After the initial coil assembly 54 and the stator core 24 are inserted and disposed as described above, the initial coil assembly 54 and the stator core 24 are positioned in the circumferential direction, the jig is pushed against the coil end portions 44 and 46 of the concentrically wound coils 26 constituting the initial coil assembly 54 to push the coil end portions 44 and 46 radially outward. When the coil end portions 44 and 46 of the concentrically wound coils 26 are pushed radially outward, the slot accommodation portions 40 and 42 connected to the coil end portions 44 and 46 follow the pushed coil end portions 44 and 46 and are pulled from the inner diameter side to the outer diameter side, so the slot accommodation portions 40 and 42 are inserted into the slots 34.

In the insertion process of the slot accommodation portions 40 and 42, the concentrically wound coils 26 are deformed so that the distance (interval) in the circumferential direction between the slot accommodation portion 40 and the slot accommodation portion 42 is gradually increased and the distance in the axial direction between the end in the axial direction of the coil end portion 44 and the end in the axial direction of the coil end portion 46 is gradually reduced.

In this stator assembling method, the two concentrically wound coils 26 disposed in different positions in the circumferential direction are assembled to each other so that the flat conductive wires of the slot accommodation portions 40 and 42 are alternately arranged radially in the same slots 34 and, after the initial coil assembly 54 including a predetermined number of the concentrically wound coils 26 disposed annularly is formed, in the state in which the initial coil assembly 54 is disposed in the inner diameter side space 28 (formed in a hollow cylinder) of the stator core 24, the slot accommodation portions 40 and 42 of the plurality of the concentrically wound coils 26 constituting the coil assembly 54 can be inserted into the slots 34 of the stator core 24 and the concentrically wound coils 26 constituting the coil assembly 54 can be assembled to the stator core 24.

Figure 5:
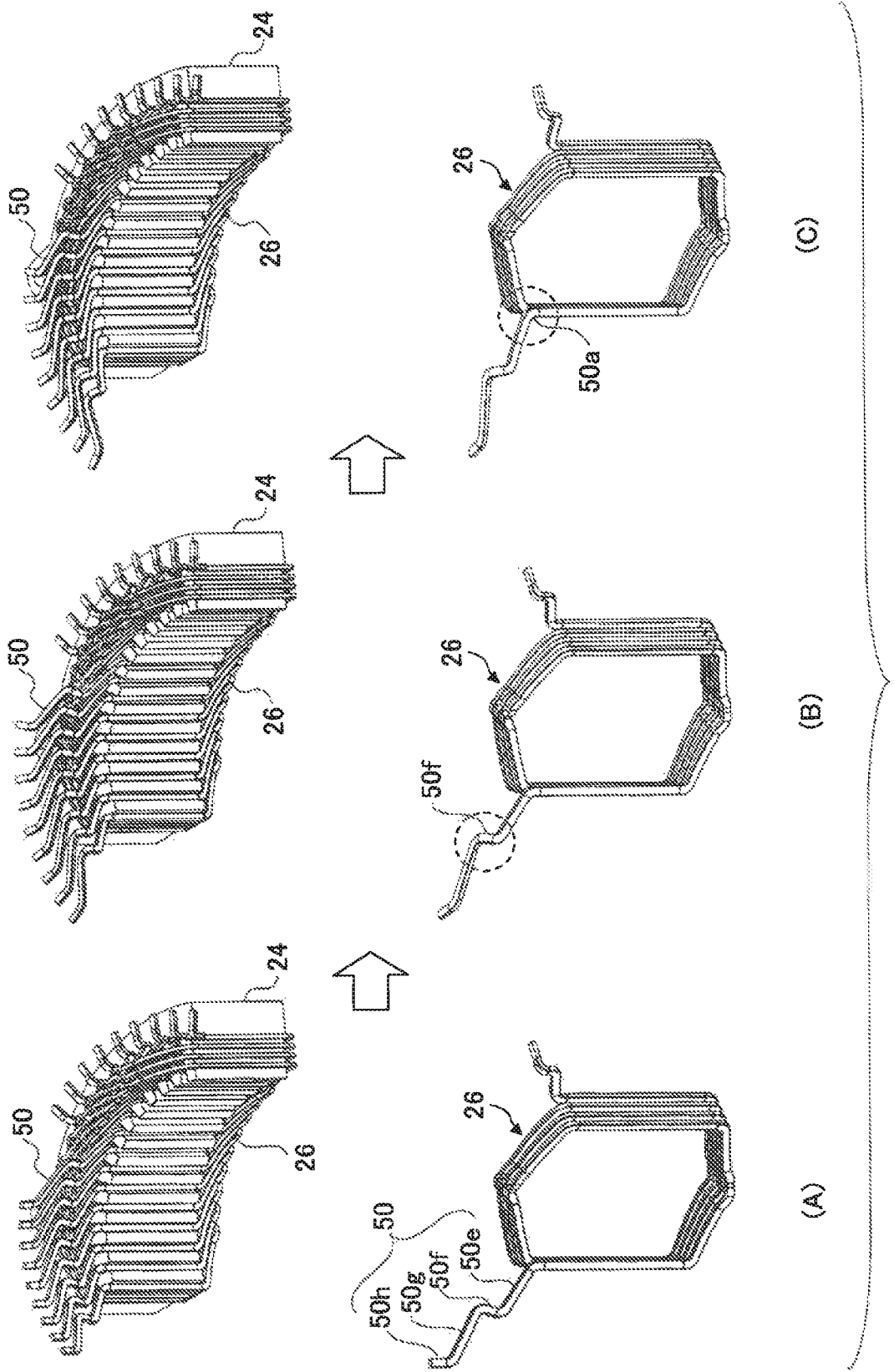
FIG. 5 illustrates the process of bending the lead wire portions of the concentrically wound coils in the stator manufacturing method and the stator manufacturing apparatus according to the embodiment.
Figure 6:
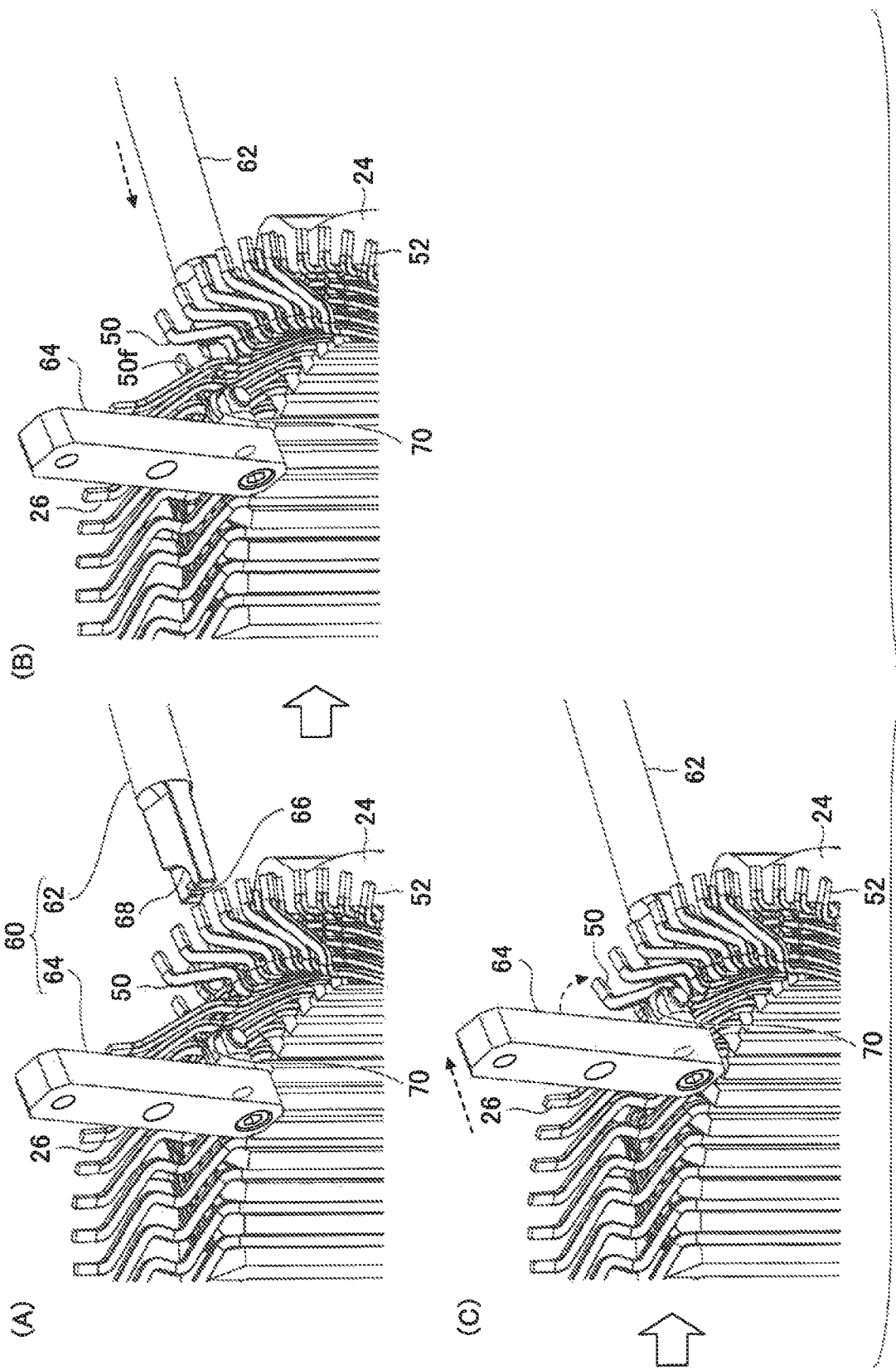
FIG. 6 illustrates a preprocess jig included in the stator manufacturing apparatus according to the embodiment and the process of bending the lead wire portions of the concentrically wound coils using the preprocess jig.
Figure 7:
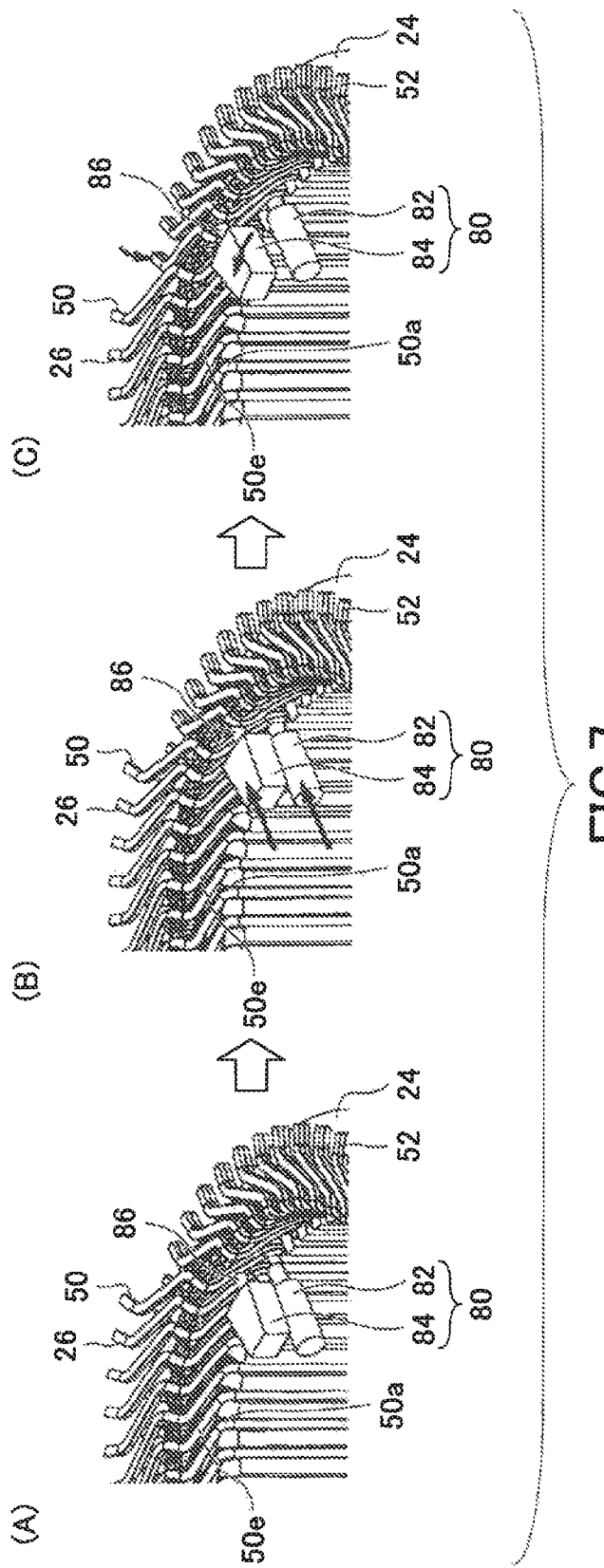
FIG. 7 illustrates a post-process jig included in the stator manufacturing apparatus according to the embodiment and the process of bending the lead wire portion of the concentrically wound coils using the post-process jig.

FIG. 5 illustrates the process of bending the lead wire portions 50 and 52 of the concentrically wound coils 26 in the stator manufacturing method and the stator manufacturing apparatus 20 according to the embodiment. FIG. 6 illustrates the preprocess jig included in the stator manufacturing apparatus 20 according to the embodiment and the process of bending the lead wire portions 50 of the concentrically wound coils 26 using the preprocess jig. FIG. 7 illustrates the post-process jig included in the stator manufacturing apparatus 20 according to the embodiment and the process of bending the lead wire portion 50 of the concentrically wound coil 26 using the post-process jig. FIG. 6(A) and FIG. 7(A) illustrate the states before bending.

Figure 8A:
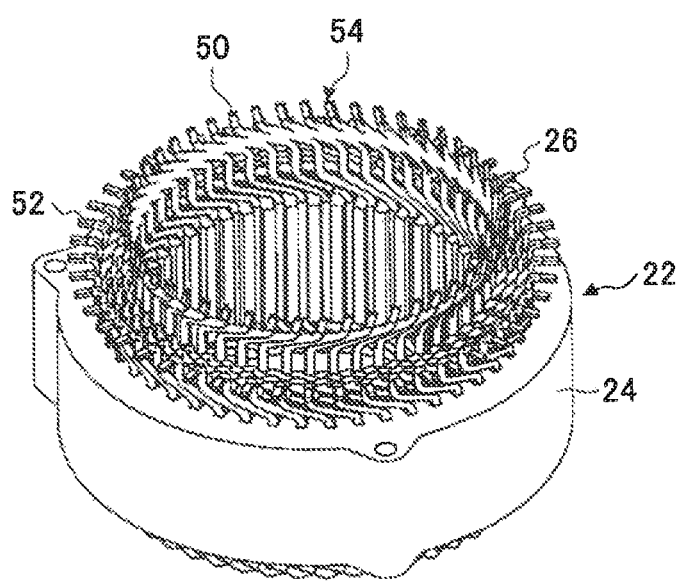
FIG. 8A is a perspective view illustrating the state before bending the lead wire portions of the concentrically wound coils in the stator manufacturing method and the stator manufacturing apparatus according to the embodiment.
Figure 8B:
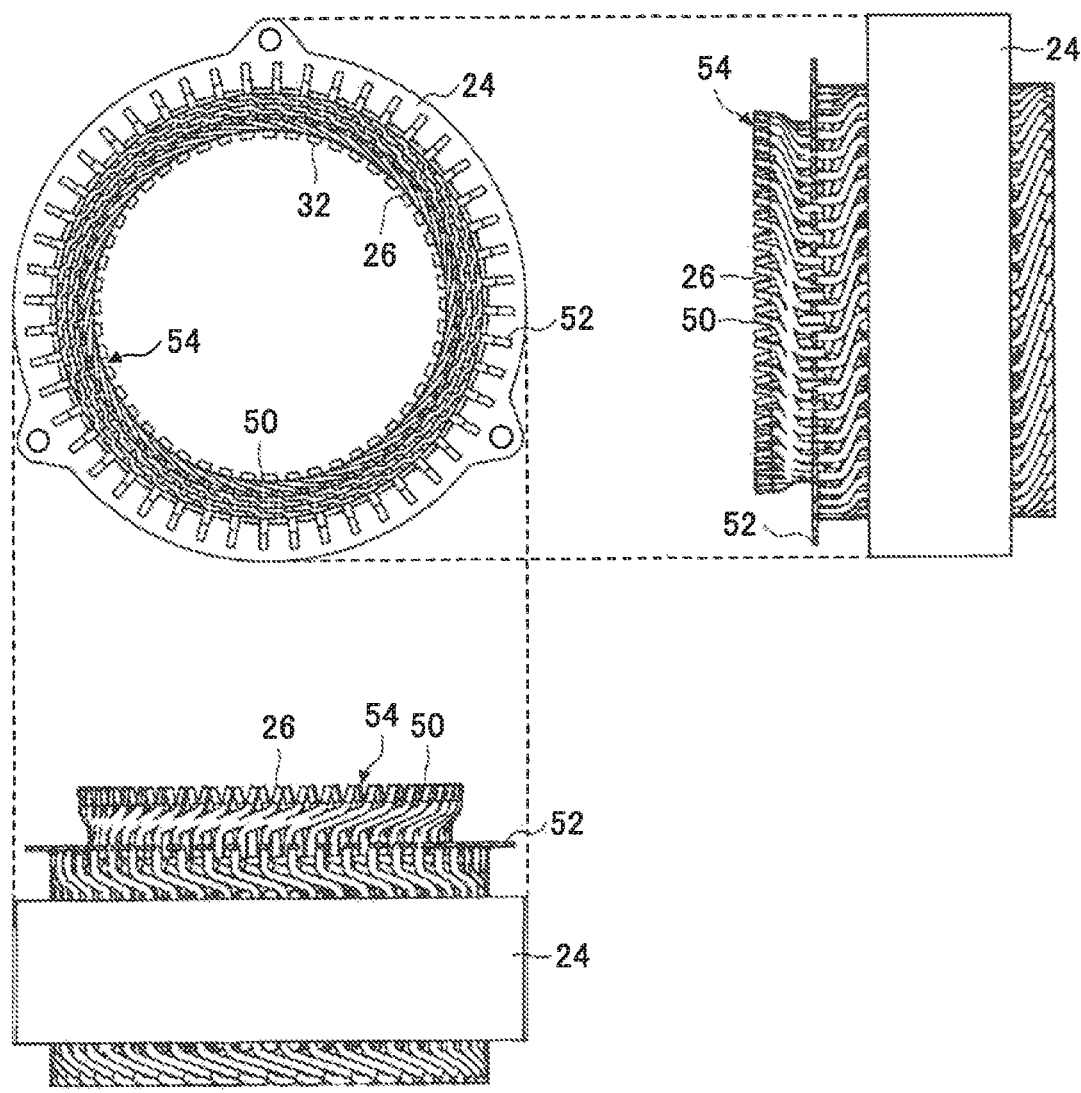
FIG. 8B is a three-plane view illustrating the state before bending the lead wire portions of the concentrically wound coils in the stator manufacturing method and the stator manufacturing apparatus according to the embodiment.
Figure 9A:
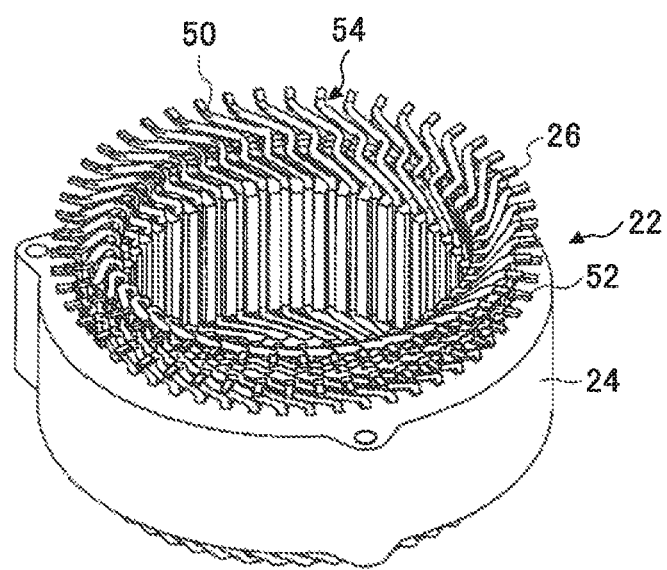
FIG. 9A is a perspective view illustrating the state after bending the lead wire portion of the concentrically wound coil using the preprocess jig in the stator manufacturing method and the stator manufacturing apparatus according to the embodiment.
Figure 9B:
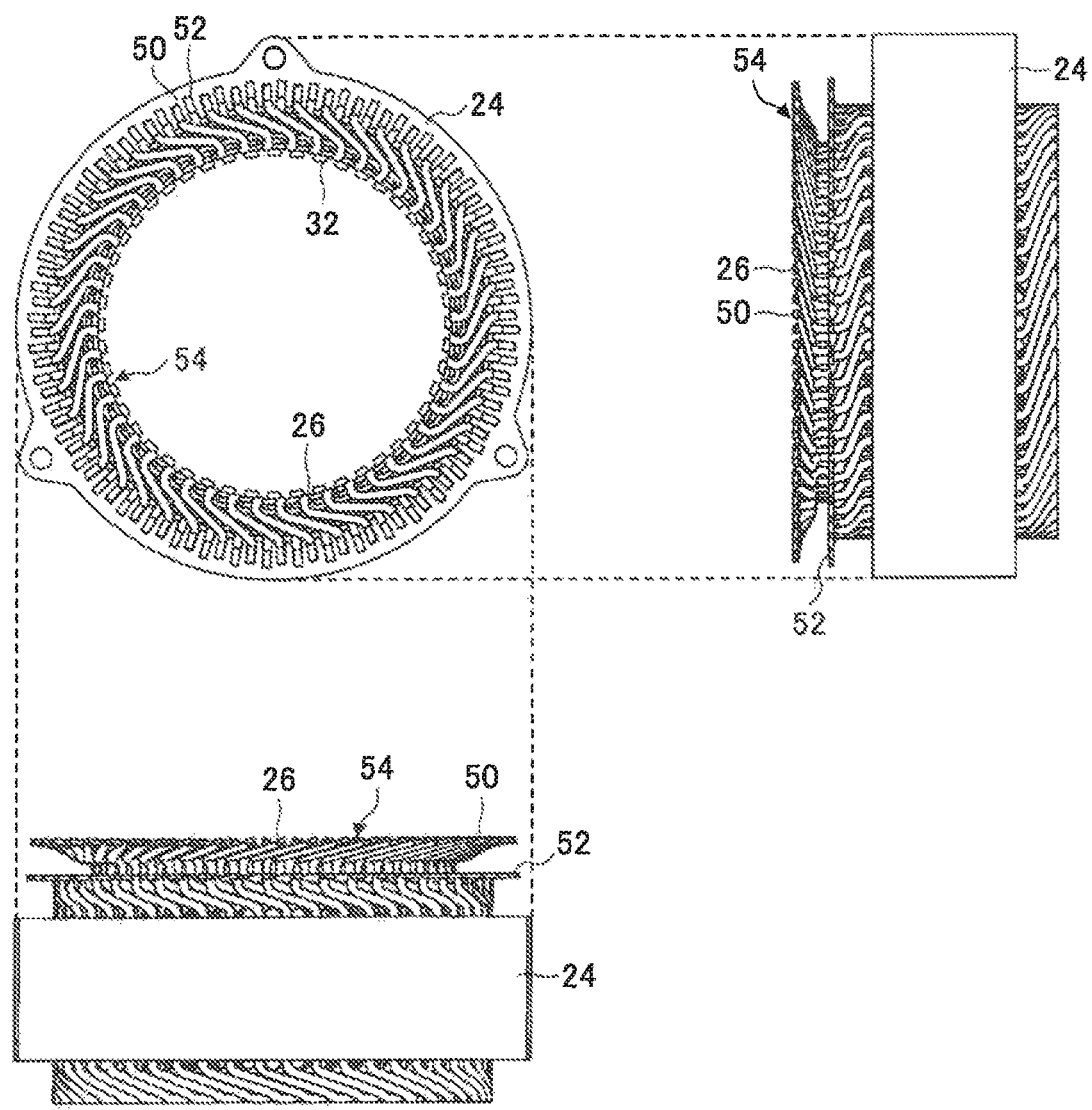
FIG. 9B is a three-plane view illustrating the state after bending the lead wire portions of the concentrically wound coils using the preprocess jig in the stator manufacturing method and the stator manufacturing apparatus according to the embodiment.
Figure 10A:
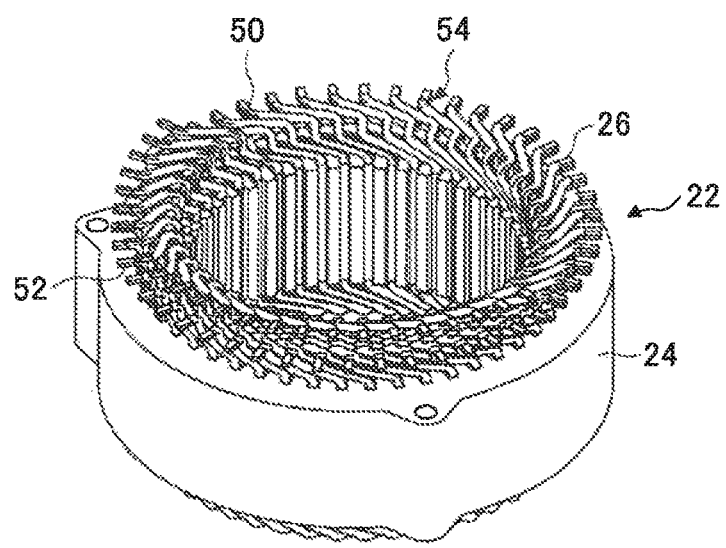
FIG. 10A is a perspective view illustrating the state while bending the lead wire portions of the concentrically wound coils using the post-process jig in the stator manufacturing method and the stator manufacturing apparatus according to the embodiment.
Figure 10B:
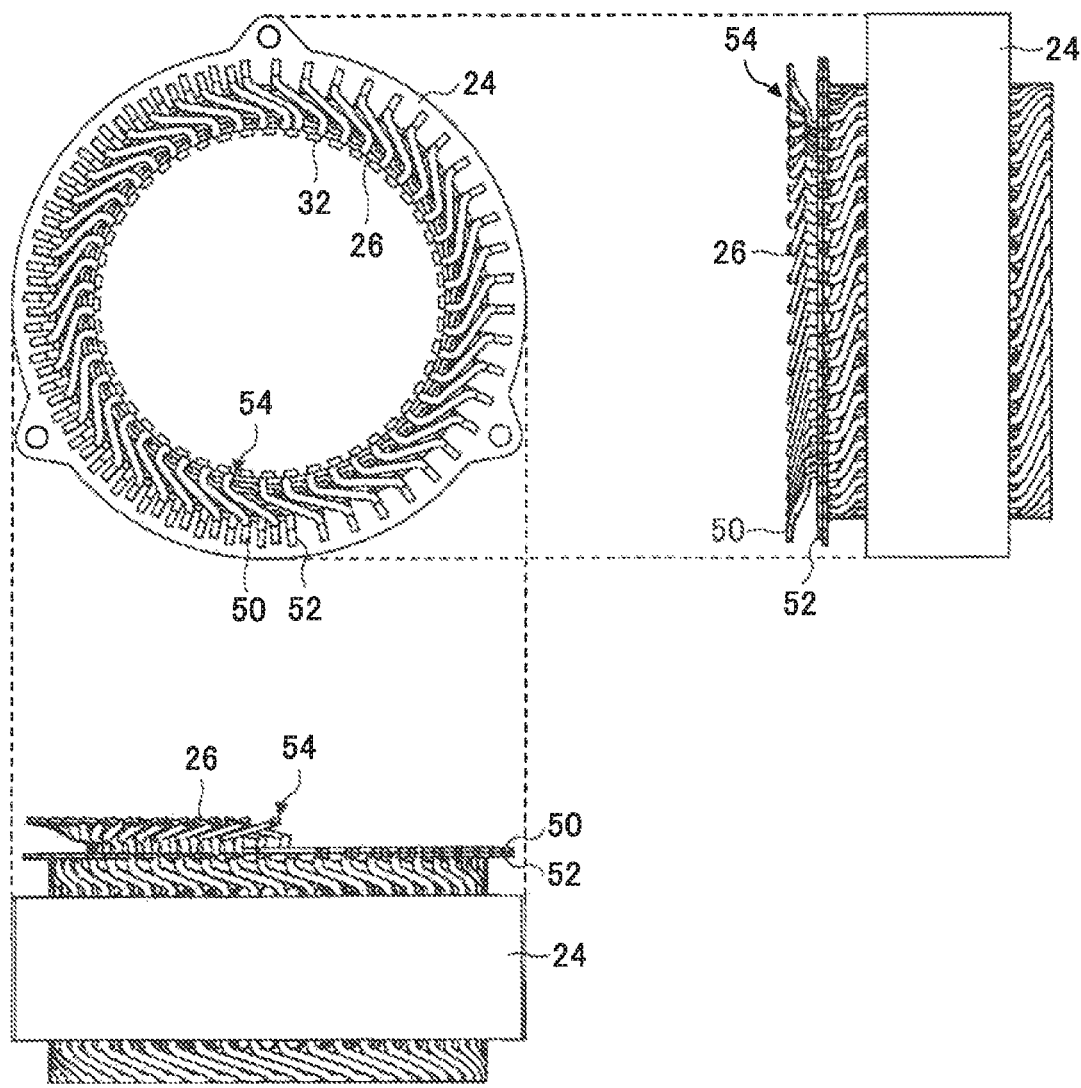
FIG. 10B is a three-plane view illustrating the state while bending the lead wire portions of the concentrically wound coils using the post-process jig in the stator manufacturing method and the stator manufacturing apparatus according to the embodiment.
Figure 11A:
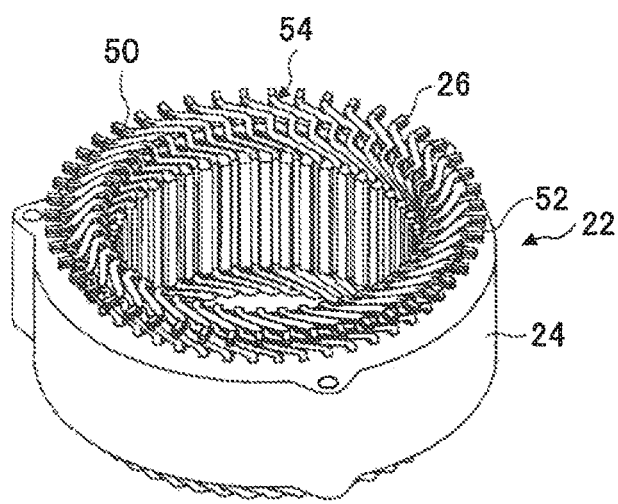
FIG. 11A is a perspective view illustrating the state after bending the lead wire portions of the concentrically wound coils using the post-process jig in the stator manufacturing method and the stator manufacturing apparatus according to the embodiment.
Figure 11C:
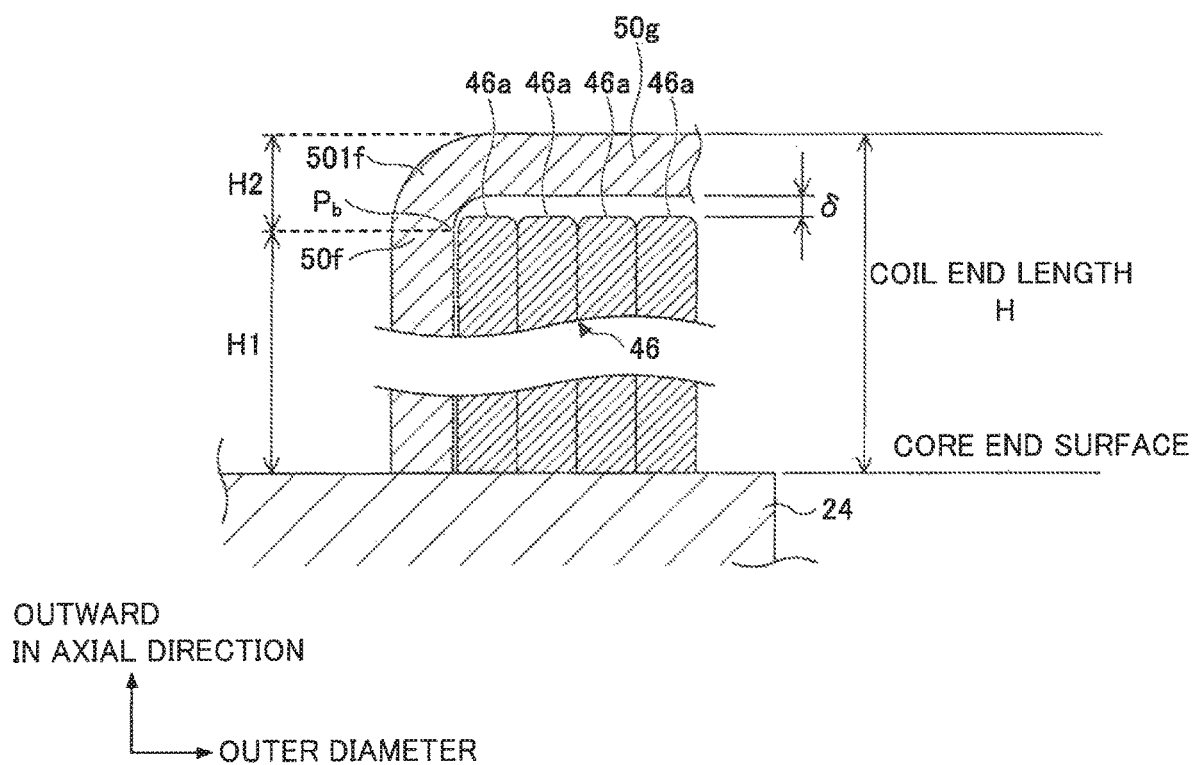
FIG. 11C is an enlarged view schematically illustrating portion X in FIG. 11B.

FIG. 8A and FIG. 8B illustrate the state before bending the lead wire portions 50 of the concentrically wound coils 26 in the stator manufacturing method and the stator manufacturing apparatus 20 according to the embodiment. FIG. 9A and FIG. 9B illustrate the state after bending the lead wire portions 50 of the concentrically wound coils 26 using the preprocess jig in the stator manufacturing method and the stator manufacturing apparatus 20 according to the embodiment. FIG. 10A and FIG. 10B illustrate the state while bending the lead wire portions 50 of the concentrically wound coils 26 using the post-process jig in the stator manufacturing method and the stator manufacturing apparatus 20 according to the embodiment. In addition, FIG. 1A and FIG. 11C illustrate the state after bending the lead wire portions 50 of the concentrically wound coils 26 using the post-process jig in the stator manufacturing method and the stator manufacturing apparatus 20 according to the embodiment.

FIG. 8A, FIG. 9A, FIG. 10A, and FIG. 11A illustrate perspective views. FIG. 8B, FIG. 9B, and FIG. 10B are three-plane views each including a front view seen from the axial direction from which the lead wire portions 50 and 52 can be seen, a side view, and another side view. In addition, FIG. 11B includes a front view seen from the axial direction from which the lead wire portions 50 and 52 can be seen, a side view, and a cross sectional view taken along line III-III. FIG. 11C is a schematic diagram enlarging portion X in FIG. 11B.

Figure 12:
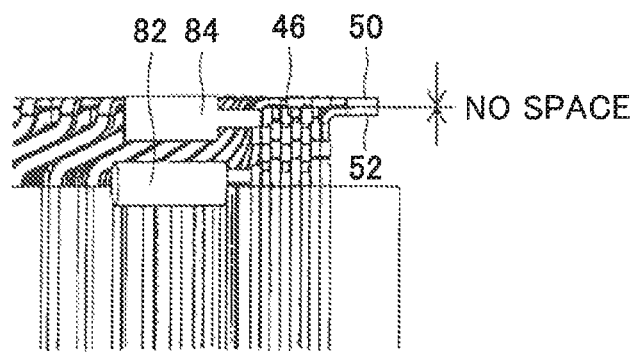
FIG. 12 illustrates the relationship between the positions in the axial direction of the post-process jig included in the stator manufacturing apparatus according to the embodiment and the lead wire portions of the concentrically wound coils bent by the post-process jig.

FIG. 12 illustrates the relationship between the positions in the axial direction of the post-process jig included in the stator manufacturing apparatus 20 according to the embodiment and the lead wire portions 50 of the concentrically wound coils 26 bent by the post-process jig. FIG. 12 is a cross sectional view illustrating the stator 22. In addition, FIG. 13 illustrates effects obtained when the lead wire portion 50 of the concentrically wound coil 26 is bent in the stator manufacturing method and the stator manufacturing apparatus 20 according to the embodiment.

In the embodiment, when the slot accommodation portions 40 and 42 of all the concentrically wound coils 26 constituting the coil assembly 54 shaped like an annular cage are pushed toward the outer diameter side, all the concentrically wound coils 26 are radially pushed from the inner diameter side to the outer diameter side, the concentrically wound coils 26 are attached to the stator core 24, and the lead wire portions 50 and 52 (particularly, the inner diameter side lead wire portions 50) of the concentrically wound coils 26 are bent. This bending is performed so that the inner diameter side lead wire portion 50 extends radially outward across the coil end portion 46 to connect the end of the inner diameter side lead wire portion 50 of one concentrically wound coil 26 to the end of the outer diameter side lead wire portion 52 of the other concentrically wound coil 26 of the two concentrically wound coils 26 disposed apart from each other in the circumferential direction by a predetermined distance.

Specifically, before the stator manufacturing apparatus 20 performs bending, the inner diameter side lead wire portion 50 is formed to have the extending portions 50e, 50f, 50g, and 50h formed substantially concentrically (FIG. 5(A)). First, the stator manufacturing apparatus 20 performs flatwise bending of the inner diameter side lead wire portion 50 using, as a fulcrum, the extending portion 50f (the portion surrounded by the dashed line in FIG. 5(B)) extending substantially in the axial direction so that the portion (specifically, the extending portions 50g and 50h and referred to below simply as "the end side portions 50g and 50h") positioned closer to the end than the extending portion 50f topples radially outward (FIG. 5(B)). Next, using the bent portion 50a (the portion surrounded by the dashed line in FIG. 5(C)) as a fulcrum, edgewise bending of the part (specifically, the extending portions 50e, 50f, 50g, and 50h, that is, the entire inner diameter side lead wire portion 50) positioned closer to the end than the bent portion 50a is performed along the circumferential direction of the stator core 24 so as to approach the end surface in the axial direction of the stator core 24 (counterclockwise in FIG. 5) (FIG. 5(C)).

The stator manufacturing apparatus 20 has a flatwise (FW) jig 60 for flatwise bending of the inner diameter side lead wire portion 50. The FW jig 60 includes a fulcrum jig 62 for supporting the inner diameter side lead wire portion 50 when performing flatwise bending of the inner diameter side lead wire portion 50 and a bending jig 64 for bending the inner diameter side lead wire portion 50 when performing flatwise bending of the inner diameter side lead wire portion 50.

The fulcrum jig 62 is a member extending like a bar, has a support portion 66 having a U-shaped notch at its end into which one inner diameter side lead wire portion 50 can be fitted, and has a cutout portion 68 that has been cut out in the portion with which the surface of the inner diameter side lead wire portion 50 makes contact when flatwise bending of the inner diameter side lead wire portion 50 is performed. The fulcrum jig 62 is supported by a moving mechanism (not illustrated) movably in a radial direction of the stator 22. The fulcrum jig 62 is movable in a radial direction along the vertex portion of the coil end portion 46 right above the vertex portion. The fulcrum jig 62 is moved from radially outward to radially inward of the stator 22 immediately before flatwise bending of the inner diameter side lead wire portion 50 is performed so that the extending portion 50f of the inner diameter side lead wire portion 50 is fitted into the support portion 66.

In addition, the bending jig 64 has a depression portion 70 that can make contact with the surface corresponding to the longer side of the cross section of the flat conductive wire of the inner diameter side lead wire portion 50. The depression portion 70 is configured by, for example, a rotatable roller. The bending jig 64 is supported by a moving mechanism (not illustrated) movably in a radial direction of the stator 22. When flatwise bending of the inner diameter side lead wire portion 50 is performed, the bending jig 64 is moved from radially inward to radially outward of the stator 22 and pushes the inner diameter side lead wire portion 50 radially outward while making contact with the end side of the extending portion 50f of the inner diameter side lead wire portion 50 via the depression portion 70.

The stator manufacturing apparatus 20 also has an edgewise (EW) jig 80 for edgewise bending of the inner diameter side lead wire portion 50. The EW jig 80 includes a fulcrum jig 82 for supporting the inner diameter side lead wire portion 50 when performing edgewise bending of the inner diameter side lead wire portion 50 and a bending jig 84 for bending the inner diameter side lead wire portion 50 when performing edgewise bending of the inner diameter side lead wire portion 50.

The fulcrum jig 82 is a member extending like a round bar and formed so as to be fitted into the gap between the inner diameter side lead wire portions 50 of the two concentrically wound coils 26 adjacent to each other in the circumferential direction. The diameter of the fulcrum jig 82 is substantially the same as the width in the circumferential direction of the tooth 32. The fulcrum jig 82 is supported by a moving mechanism (not illustrated) movably in a radial direction of the stator 22. Immediately before edgewise bending of the inner diameter side lead wire portion 50 is performed, the fulcrum jig 82 is moved from radially inward to radially outward of the stator 22 so as to be fitted into the gap between the inner diameter side lead wire portions 50 of the concentrically wound coils 26 adjacent to each other in the circumferential direction. The position to which the fulcrum jig 82 is moved is the position adjacent to the root portion of the inner diameter side lead wire portion 50, that is, the position adjacent to the bent portion 50a in the vicinity of the connection part between the inner diameter side lead wire portion 50 and the slot accommodation portion 40.

In addition, the bending jig 84 has a depression portion 86 that can make contact with the surface corresponding to the shorter side of the cross section of the flat conductive wire of the inner diameter side lead wire portion 50. The depression portion 86 is a member formed in, for example, a round bar and is formed so as to be fitted into the gap between the inner diameter side lead wire portions 50 of the two concentrically wound coils 26 adjacent to each other in the circumferential direction. Before edgewise bending, the diameter of the depression portion 86 is made smaller than the distance between the extending portions 50e of the inner diameter side lead wire portions 50 of the two concentrically wound coils 26 adjacent to each other in the circumferential direction or the distance between the portions closer to the ends than the extending portions 50e.

The bending jig 84 is supported by a moving mechanism (not illustrated) movably in the radial direction and the circumferential direction of the stator 22. When edgewise bending of the inner diameter side lead wire portions 50 is performed, the bending jig 84 is moved in the circumferential direction of the stator 22 and pushes the inner diameter side lead wire portion 50 in the circumferential direction while making contact with the extending portion 50e of the inner diameter side lead wire portion 50 or the portion closer to the end than the extending portion 50e via the depression portion 86.

In the embodiment, after the slot accommodation portions 40 and 42 of all the concentrically wound coils 26 constituting the coil assembly 54 shaped like an annular cage are inserted into the slots 34 of the stator core 24, the fulcrum jig 62 of the FW jig 60 is moved from radially outward to radially inward of the stator 22 so that the extending portion 50f of the inner diameter side lead wire portion 50 is fitted into the support portion 66 (FIG. 6(B)). When the extending portion 50f of the inner diameter side lead wire portion 50 is fitted into the support portion 66 of the fulcrum jig 62, the bending jig 64 is moved from radially inward to radially outward of the stator 22 in the state in which the extending portion 50f is supported by the fulcrum jig 62 (FIG. 6(C)).

When the FW jig 60 is moved as described above, the inner diameter side lead wire portion 50 is bent using the extending portion 50f as a fulcrum so that the end side portions 50g and 50h closer to the end than the extending portion 50f topple radially outward, from the state illustrated in FIG. 8A and FIG. 8B (see FIG. 9A and FIG. 9B). The bending of the inner diameter side lead wire portion 50 is performed until the surface corresponding to the longer side of the cross section of the flat conductive wire of the inner diameter side lead wire portion 50 makes contact with the cutout portion 68 of the fulcrum jig 62. When the bending is completed, the end side portions 50g and 50h closer to the end than the extending portion 50f of the inner diameter side lead wire portion 50 may extend slightly outward in the axial direction in addition to the circumferential direction and the radial direction instead of extending parallel to the end surface in the axial direction of the stator core 24.

When the above FW jig 60 has been moved and bending has been performed, the FW jig 60 is returned to the waiting position by the moving mechanism.

After the bending by the movement of the above FW jig 60 is completed, the fulcrum jig 82 of the EW jig 80 is moved from radially inward to radially outward of the stator 22 so as to be fitted into the gap between the inner diameter side lead wire portions 50 of the two concentrically wound coils 26 adjacent to each other in the circumferential direction (FIG. 7(B)). After the movement is performed, the fulcrum jig 82 is positioned adjacently in the circumferential direction to the root portion (specifically, the bent portion 50a in the vicinity of the connection part connecting to the slot accommodation portion 40) of the inner diameter side lead wire portion 50 of the concentrically wound coil 26 (the concentrically wound coil 26 on the right side in FIG. 7, which is referred to below as the bending target concentrically wound coil 26) having the fulcrum jig 82 in the circumferential direction (the counterclockwise in FIG. 7) in which the inner diameter side lead wire portion 50 is crooked and bent, of the two concentrically wound coils 26 adjacent to each other in the circumferential direction to which the fulcrum jig 82 is to be fitted.

In addition, after or while the above fulcrum jig 82 is moved from radially inward to radially outward, the bending jig 84 is moved from radially inward to radially outward of the stator 22 so that the depression portion 86 is fitted into the gap between the inner diameter side lead wire portions 50 of the two concentrically wound coils 26 adjacent to each other in the circumferential direction (FIG. 7(B)). After completion of the movement, the bending jig 84 is positioned adjacently in the circumferential direction to the middle portion (specifically, the extending portion 50e or the portion closer to the end than the extending portion 50e) of the inner diameter side lead wire portion 50 of the bending target concentrically wound coil 26 (the concentrically wound coil 26 on the left side in FIG. 7) having the bending jig 84 in the circumferential direction (the clockwise in FIG. 7) opposite to the circumferential direction in which the inner diameter side lead wire portion 50 is crooked and bent, of the two concentrically wound coils 26 adjacent to each other in the circumferential direction to which the bending jig 84 is to be fitted.

After the movement of the above bending jig 84 from radially inward to radially outward, in the state in which the bent portion 50a of the inner diameter side lead wire portion 50 of the bending target concentrically wound coil 26 is supported by the fulcrum jig 82, the bending jig 84 is moved in the circumferential direction (the counterclockwise in FIG. 7) of the stator 22 while making contact with the middle portion of the inner diameter side lead wire portion 50 of the bending target concentrically wound coil 26 (FIG. 7(C)).

After the EW jig 80 is moved as described above, the inner diameter side lead wire portion 50 is bent using the bent portion 50a as a fulcrum in the direction (the edgewise direction in the bent portion 50a) in which the part positioned closer to the end than the bent portion 50a approaches the end surface in the axial direction of the stator core 24 along the circumferential direction of the stator core 24 (see FIG. 10A, FIG. 10B, FIG. 11A, and FIG. 11B). The bending of the inner diameter side lead wire portion 50 is performed until just before the surface corresponding to the longer side of the cross section of the flat conductive wire of the inner diameter side lead wire portion 50 makes contact with the vertex portion of the coil end portion 46 of another concentrically wound coil 26. In the bending, the inner diameter side lead wire portion 50 is bent so that the bending angle of the bent portion 50a changes from a predetermined angle smaller than a final desired angle to the desired angle.

When the bending of the inner diameter side lead wire portion 50 is completed, the end side portions 50g and 50h of the inner diameter side lead wire portion 50 only need to extend parallel to the end surface in the axial direction of the stator core 24 and the surfaces corresponding to the longer sides of the cross sections of the flat conductive wires of the end side portions 50g and 50h only need to be formed parallel to the end surface in the axial direction of the stator core 24.

When the EW jig 80 has been moved and bending has been performed, the EW jig 80 is returned to the waiting position by the moving mechanism. The bending by the movement of the EW jig 80 may be performed concurrently on all the concentrically wound coils 26 constituting the coil assembly 54 shaped like an annular cage as long as interference with the concentrically wound coil 26 adjacent in the circumferential direction is prevented (see FIG. 14A and FIG. 14B) or may be performed repeatedly for each of the concentrically wound coils 26.

After that, the end of the inner diameter side lead wire portion 50 (having undergone the above bending) of the concentrically wound coil 26 is connected by welding or the like to the end of the outer diameter side lead wire portion 52 of another concentrically wound coil 26 disposed apart in the circumferential direction by a predetermined distance. These ends are connected to each other in the state in which the ends are oriented radially outward.

As described above, in the embodiment, after all the concentrically wound coils 26 constituting the coil assembly 54 shaped like an annular cage are attached to the stator core 24, the inner diameter side lead wire portion 50 of each of the concentrically wound coils 26 may be bent so as to extend radially outward across the coil end portion 46 of another concentrically wound coil 26. Specifically, the FW jig 60 is first used to perform the process of performing flatwise bending of the inner diameter side lead wire portion 50 entirely formed substantially concentrically as illustrated in FIG. 13(A) so that the end side portions 50g and 50h closer to the end than the extending portion 50f topple radially outward using the extending portion 50f as a fulcrum (see FIG. 13(B)). This forms a flatwise bent portion 501f (see FIG. 11C) in the end part of the extending portion 50f. After that, the process of using the EW jig 80 to perform edgewise bending of the inner diameter side lead wire portion 50 using the bent portion 50a (the root portion) as a fulcrum so that the part (specifically, the entire inner diameter side lead wire portion 50) positioned closer to the end than the bent portion 50a approaches the end surface in the axial direction of the stator core 24 along the circumferential direction of the stator core 24 (see FIG. 13(C)).

In the stator manufacturing method using the stator manufacturing apparatus 20, the FW jig 60 can be used to perform flatwise bending of the inner diameter side lead wire part 50 using the extending portion 50f as a fulcrum so that the part positioned closer to the end than the extending portion 50f topples radially outward. In the stator manufacturing method, the fulcrum jig 62 needs to be disposed between the vertex portion of the coil end portion 46 and the flatwise bent portion 501f (FIG. 11C), which is used as a fulcrum of flatwise bending, closer to the end than the extending portion 50f and, after the flatwise bending, the space equivalent to the thickness of the support portion 66 of the fulcrum jig 62 is formed between the vertex portion of the coil end portion 46 and the flatwise bent portion.

However, in the stator manufacturing method using the stator manufacturing apparatus 20 according to the embodiment, after flatwise bending of the inner diameter side lead wire portion 50 using the above FW jig 60, edgewise bending of the inner diameter side lead wire portion 50 can be performed using the bent portion 50a, which is the root portion, as a fulcrum with the EW jig 80 so that the part positioned closer to the end than the bent portion 50a approaches the end surface in the axial direction of the stator core 24 along the circumferential direction of the stator core 24.

Since the position of the end in the axial direction of the inner diameter side lead wire portion 50 approaches the end surface in the axial direction of the stator core 24 in the edgewise bending in which the bent portion 50*a* is used as a fulcrum, the dimension in the axial direction of the concentrically wound coil 26 is reduced. In addition, if the edgewise bending is performed so that the position in the axial direction of the end of the inner diameter side lead wire portion 50 approaches the end surface in the axial direction of the stator core 24 by the thickness of the support portion 66 of the fulcrum jig 62, it is possible to reduce the space equivalent to the thickness of the support portion 66 of the fulcrum jig 62 formed between the vertex portion of the coil end portion 46 and the flatwise bent portion by the flatwise bending, thereby further reducing the dimension in the axial direction of the concentrically wound coil 26 (see FIG. 12).

Therefore, in the stator manufacturing method using the stator manufacturing apparatus 20 according to the embodiment, the dimension in the axial direction of the entire stator 22 can become smaller (the structure illustrated in FIG. 13(C)) than in the structure (the structure illustrated in FIG. 13(D)) of a comparative example in which the flatwise bending of the inner diameter side lead wire portion 50 of the concentrically wound coil 26 using the extending portion 50*f* as a fulcrum described above is performed and the edgewise bending using the bent portion 50*a* as a fulcrum described above is not performed.

More specifically, as illustrated in FIG. 11C, in the embodiment, a bending start point Pb of the flatwise bent portion 501*f* of the extending portion 50*f* is disposed so as to overlap with the vertex portion 46*a* of the coil end portion 46 as seen in the radial direction and the extending portion 50*g* and the extending portion 50*h* (referred to below simply as the end side portions 50*g* and 50*h*) closer to the end than the extending portion 50*f* of the lead wire portion 50 are disposed parallel to the end surface of the stator core 24. Here, the bending start point Pb is the position at which the lead wire portion 50 is bent at 90 degrees with respect to the end side portions 50*g* and 50*h* of the lead wire portion 50 and the bending start point Pb is positioned closer in the axial direction to the stator core 24 than the vertex portion 46*a* of the coil end portion 46.

Here, a coil end length H is the sum of a height H1 up to the bending start point Pb and height H2 from the bending start point Pb to the end portion of the end side portions 50*g* and 50*h*. In the embodiment, height H1 can be smaller than in the case in which the bending start point Pb is positioned outward in the axial direction of the vertex portion 46*a* of the coil end portion 46. In addition, in the embodiment, height H2 can become smaller than in the case in which the end side portions 50*g* and 50*h* are disposed obliquely outward in the axial direction instead of parallel to the end surface of the stator core 24. Accordingly, in the embodiment, as illustrated in FIG. 11C, distance 6 (space) in the axial direction between the vertex portion 46*a* and the end side portions 50*g* and 50*h* can be reduced. As a result, the dimension in the axial direction of the stator 22 can become smaller than in the case in which the bending start point Pb is positioned outward in the axial direction of the vertex portion 46*a* of the coil end portion 46.

In the above embodiment, the inner diameter side lead wire portion 50 corresponds to a "lead wire portion" designated in the appended claims, the extending portion 50*f* corresponds to a "predetermined part" designated in the appended claims, and the bent portion 50*a* corresponds to a "connection part" designated in the appended claims.

In the above embodiment, the lead wire portions 50 and 52 of the concentrically wound coils 26 are crooked and bent before the coil assembly 54 is configured, as illustrated in FIG. 2. However, the disclosure is not limited to the embodiment and the lead wire portions 50 and 52 may be crooked and bent in a shape other than that illustrated in FIG. 2. However, particularly the inner diameter side lead wire portion 50 needs to have a part extending in the axial direction before flatwise bending so that radially outward flatwise bending is enabled and needs to have a part that topples radially outward and straddles the coil end portion 46 by the radially outward flatwise bending. In addition, the inner diameter side lead wire portion 50 only needs to be bent in advance at a predetermined angle smaller than a desired angle so as to follow the circumferential direction before the coil assembly 54 is configured and the concentrically wound coil 26 is inserted into the slots 34.

Figure 14A:
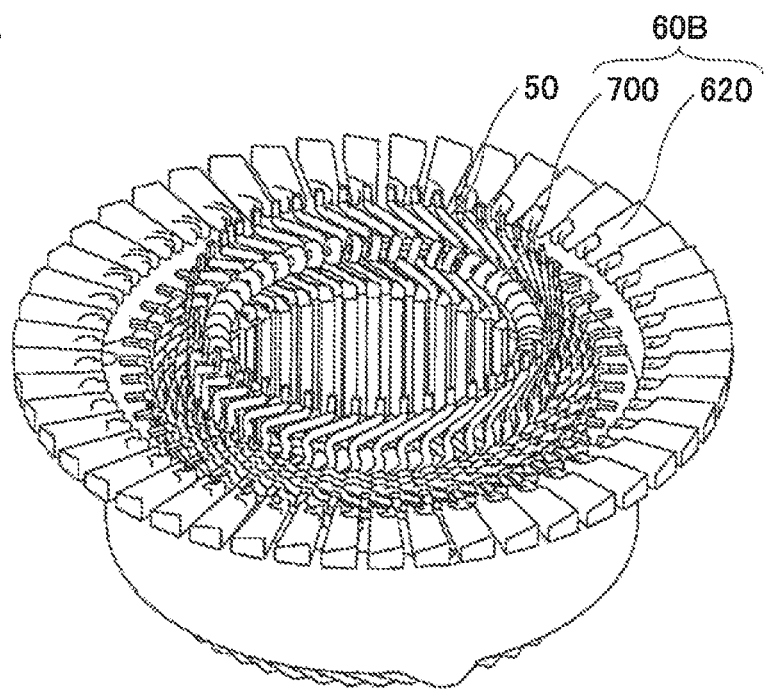
FIG. 14A illustrates a preprocess jig included in a stator manufacturing apparatus according to another embodiment and the process of bending the lead wire portions of the concentrically wound coils using the preprocess jig.
Figure 14B:
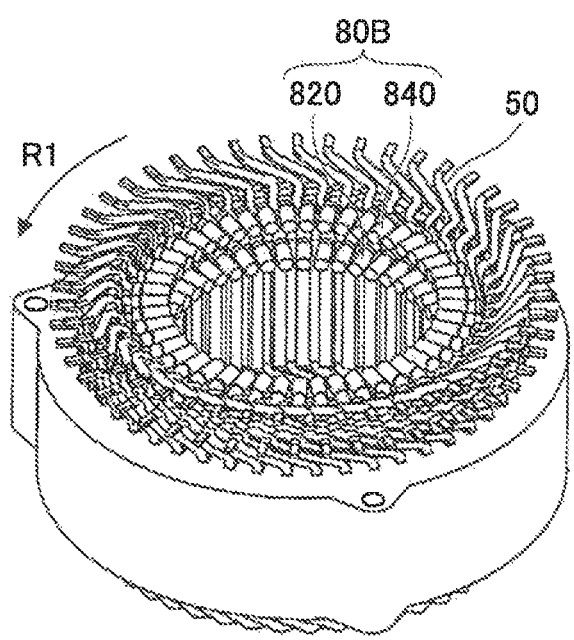
FIG. 14B illustrates a preprocess jig included in another stator manufacturing apparatus and the process of bending the lead wire portions of the concentrically wound coils using the preprocess jig.

FIG. 14A illustrates a preprocess jig included in the stator manufacturing apparatus and another embodiment of a flatwise bending process using the extending portion 50*f* as a fulcrum of the process of bending the lead wire portions of the concentrically wound coils using the preprocess jig. FIG. 14B illustrates a preprocess jig included in the stator manufacturing apparatus and another embodiment of edgewise bending using the bent portion 50*a* as a fulcrum of the process of bending the lead wire portions of the concentrically wound coils using the preprocess jig.

In flatwise bending, as illustrated in FIG. 14A, the plurality of lead wire portions 50 may be bent at a time or the entire circumference (all lead wire portions) may be bent at a time. In the example illustrated in FIG. 14A, a FW jig 60B is used in place of the FW jig 60 in the above embodiment. The FW jig 60B has depression portions 700 and the fulcrum jigs 620 across the entire circumference. The depression portion 700 is shaped like a roller as in the depression portion 70 of the FW jig 60 in the above embodiment. As in the fulcrum jig 62 of the FW jig 60 in the above embodiment, the fulcrum jigs 620 are moved from the outer diameter side so that the extending portions 50*f* of the inner diameter side lead wire portion 50 are fitted and are used as fulcrums when flatwise bending of the inner diameter side lead wire portions 50 is performed. When flatwise bending of the inner diameter side lead wire portions 50 is performed, the depression portions 700 are concurrently moved from radially inward to radially outward of the stator 22 and push the inner diameter side lead wire portions 50 radially outward while making contact with the end sides of the extending portions 50*f* of the inner diameter side lead wire portions 50.

In edgewise bending, as illustrated in FIG. 14B, the plurality of lead wire portions 50 may be bent at a time or the entire circumference (all lead wire portions) may be bent at a time. In the example illustrated in FIG. 14B, an EW jig 80B is used in place of the EW jig 80 in the above embodiment. The EW jig 80B has the fulcrum jigs 820 and the bending jigs 840 across the entire circumference. As in the fulcrum jig 82 of the EW jig 80 in the above embodiment, the fulcrum jigs 820 are moved from the outer diameter side so as to be fitted in the gap between the inner diameter side lead wire portions 50 of the two concentrically wound coils 26 adjacent to each other in the circumferential direction and are used as fulcrums when edgewise bending of the inner diameter side lead wire portions 50 is performed. When edgewise bending of the inner diameter side lead wire portions 50 is performed, the bending jigs 840 are concurrently moved in the circumferential direction of the stator 22 and push the inner diameter side lead wire portions 50 in the circumferential direction (see direction R2 in FIG. 14B) while making contact with the extending portions 50e of the inner diameter side lead wire portions 50 or the portions closer to the ends than the extending portions 50e.

The following examples will be further disclosed with respect to the above embodiments.

[1] A stator manufacturing method including a lead wire bending process of inserting a plurality of concentrically wound coils (26) into slots (34), each of the concentrically wound coils (26) being formed by winding a flat conductive wire for a plurality of turns, each of the slots (34) being formed between every two adjacent teeth (32) extending radially inward from an annular back yoke (30) of a stator core (24), and bending lead wire portions (50) of the inserted concentrically wound coils (26) projecting in an axial direction from an end surface of the stator core (24), wherein the lead wire portions (50) before being bent in the lead wire bending process extend in a circumferential direction while extending in the axial direction and the lead wire bending process includes a first bending process of bending the lead wire portions (50) using, as fulcrums, predetermined parts (50f) between connection parts (50a) between the lead wire portions (50) and slot accommodation portions (40) of the concentrically wound coils (26) and ends of the lead wire portions (50), the slot accommodation portions (40) being accommodated in the slots (34), so that parts positioned closer to the ends than the predetermined parts (50f) topple radially outward and a second bending process of bending the lead wire portions (50) using the connection parts (50a) as fulcrums so that the lead wire portions (50) approach the end surface of the stator core (24) along the circumferential direction of the stator core (24) after the first bending process.

In the structure described in [1] above, the lead wire portions (50) are bent using the predetermined parts (50f) as fulcrums so that the parts positioned closer to the ends than the predetermined parts (50f) topple radially outward and then the lead wire portions (50) are bent using the connection parts (50a) as fulcrums so as to approach the end surface of stator core (24) along the stator core (24). When the lead wire portions (50) are bent along the circumferential direction of the stator core (24) so as to approach the end surface of the stator core (24), the dimension in the axial direction of the concentrically wound coils (26) is reduced, thereby reducing the dimension in the axial direction of the entire stator (22).

[2] The stator manufacturing method according to [1] above, wherein the first bending process performs flatwise bending of the lead wire portions (50) and the second bending process performs edgewise bending of the lead wire portions (50).

[3] The stator manufacturing method according to [1] or [2] above, wherein the connection parts (50a) are bent in advance at a first angle so as to follow the circumferential direction before the concentrically wound coils (26) are inserted into the slots (34) and the second bending process bends the lead wire portions (50) so that the angle at which the connection parts (50a) are bent changes from the first angle to a second angle larger than the first angle.

[4] The stator manufacturing method according to any one of [1] to [3] above, wherein the lead wire bending process bends the lead wire portions (50) on an inner diameter side of the concentrically wound coils (26) inserted into the slots (34).

[5] The stator manufacturing method according to [4] above, wherein, after the bending in the second bending process, the lead wire portions (50) on the inner diameter side of the concentrically wound coils (26) are connected to the lead end portions (52) on an outer diameter side of the other concentrically wound coils (26), the lead end portions (52) on the outer diameter side projecting in the axial direction from the end surface of the stator core (24), the other concentrically wound coils (26) being disposed apart in the circumferential direction by a predetermined distance.

[6] A stator (22) including
an annular stator core (24) having a plurality of slots (34); and
a coil assembly (54) having a plurality of coils (26) to be inserted into the plurality of slots (34),
wherein the coil assembly (54) includes coil end portions (44 and 46) projecting from end surfaces in directions along a rotary axis of the stator core (24),
the coil end portions (44 and 46) include
a plurality of vertex portions (46a) projecting outward in the directions along the rotary axis, the vertex portions (46a) being provided adjacently to each other in a circumferential direction and
a plurality of lead wire portions (50 and 52) supplying electric power to the coils (26),
each of the plurality of lead wire portions (50 and 52) has a bent portion (50lf) bent radially outward from radially inward of the stator core (24) and end side portions (50g and 50h) extending toward an end from the bent portion (50f), and
a bending start point (Pb) of the bent portion (50lf) is disposed so as to overlap with the vertex portions (46a) as seen from a radial direction and the end side portions (50g and 50h) are disposed parallel to the end surfaces of the stator core (24).

In the structure described in [6] above, the dimension in the axial direction of the stator (22) can become smaller than in the case in which the bending start point (Pb) is positioned outward in the axial direction of the vertex portions (46a) of the coil end portions (46). In addition, the dimension in the axial direction of the stator (22) can become smaller than in the case in which the end side portions (50g and 50h) are disposed obliquely outward in the axial direction instead of parallel to the end surface of the stator core (24). As a result, the dimension in the axial direction of the entire stator (22) is reduced.

The present international application claims priority based on Japanese Patent Application No. 2014-163902 filed on Aug. 11, 2014 and Japanese Patent Application No. 2015-119214 filed on Jun. 12, 2015, the entire contents of which are incorporated herein by reference.

The invention claimed is:
1. A stator manufacturing method comprising:
a lead wire bending process of inserting a plurality of concentrically wound coils into slots, each of the concentrically wound coils being formed by winding a flat conductive wire for a plurality of turns, each of the slots being formed between every two adjacent teeth extending radially inward from an annular back yoke of a stator core, and bending lead wire portions of the inserted concentrically wound coils projecting in an axial direction of the stator from an end surface of the stator core,
the concentrically wound coils include coil end portions projecting from the end surface of the stator core in directions along the axial direction of the stator,
the coil end portions include a plurality of vertex portions projecting outward in the directions along the axial direction of the stator, the vertex portions provided adjacently to each other in a circumferential direction of the stator core, wherein:

the lead wire portions before being bent in the lead wire bending process extend in a circumferential direction of the stator core while extending in the axial direction of the stator core, and the lead wire bending process includes a first bending process of bending the lead wire portions using, as fulcrums, predetermined parts between connection parts between the lead wire portions and slot accommodation portions of the concentrically wound coils and ends of the lead wire portions, the predetermined parts located above the vertex portions along the axial direction of the stator, the connection parts located between a side of the stator core end surface and the vertex portions, the slot accommodation portions being accommodated in the slots, so that parts positioned closer to the ends than the predetermined parts topple radially outward from radially inward of the stator core; and a second bending process performed after the first bending process, the second bending process bending the lead wire portions using the connection parts as fulcrums so that the lead wire portions approach the end surface of the stator core along the circumferential direction of the stator, so that the lead wire approaches the end face of the stator core from the axial direction using the connection portion as a fulcrum.

2. The stator manufacturing method according to claim 1, wherein:

the first bending process performs flatwise bending of the lead wire portions, and the second bending process performs edgewise bending of the lead wire portions.

3. The stator manufacturing method according to claim 1, wherein the connection parts are bent in advance at a first angle so as to follow the circumferential direction before the concentrically wound coils are inserted into the slots, and the second bending process bends the lead wire portions so that the angle at which the connection parts are bent changes from the first angle to a second angle larger than the first angle.

4. The stator manufacturing method according to claim 2, wherein:

the connection parts are bent in advance at a first angle so as to follow the circumferential direction before the concentrically wound coils are inserted into the slots, and the second bending process bends the lead wire portions so that the angle at which the connection parts are bent changes from the first angle to a second angle larger than the first angle.

5. The stator manufacturing method according to claim 1, wherein:

the lead wire bending process bends the lead wire portions on an inner diameter side of the concentrically wound coils inserted into the slots.

6. The stator manufacturing method according to claim 2, wherein:

the lead wire bending process bends the lead wire portions on an inner diameter side of the concentrically wound coils inserted into the slots.

7. The stator manufacturing method according to claim 3, wherein:

the lead wire bending process bends the lead wire portions on an inner diameter side of the concentrically wound coils inserted into the slots.

8. The stator manufacturing method according to claim 4, wherein:

the lead wire bending process bends the lead wire portions on an inner diameter side of the concentrically wound coils inserted into the slots.

9. The stator manufacturing method according to claim 5, wherein:

after the bending in the second bending process, the lead wire portions on the inner diameter side of the concentrically wound coils are connected to the lead wire portions on an outer diameter side of the other concentrically wound coils, the lead wire portions on the outer diameter side projecting in the axial direction from the end surface of the stator core, the other concentrically wound coils being disposed apart in the circumferential direction by a predetermined distance.

10. The stator manufacturing method according to claim 6, wherein:

after the bending in the second bending process, the lead wire portions on the inner diameter side of the concentrically wound coils are connected to the lead wire portions on an outer diameter side of the other concentrically wound coils, the lead wire portions on the outer diameter side projecting in the axial direction from the end surface of the stator core, the other concentrically wound coils being disposed apart in the circumferential direction by a predetermined distance.

11. The stator manufacturing method according to claim 7, wherein:

after the bending in the second bending process, the lead wire portions on the inner diameter side of the concentrically wound coils are connected to the lead wire portions on an outer diameter side of the other concentrically wound coils, the lead wire portions on the outer diameter side projecting in the axial direction from the end surface of the stator core, the other concentrically wound coils being disposed apart in the circumferential direction by a predetermined distance.

12. The stator manufacturing method according to claim 8, wherein:

after the bending in the second bending process, the lead wire portions on the inner diameter side of the concentrically wound coils are connected to the lead wire portions on an outer diameter side of the other concentrically wound coils, the lead wire portions on the outer diameter side projecting in the axial direction from the end surface of the stator core, the other concentrically wound coils being disposed apart in the circumferential direction by a predetermined distance.

13. A stator comprising:

an annular stator core having a plurality of slots; and a coil assembly having a plurality of coils to be inserted into the plurality of slots, wherein:

the coil assembly includes coil end portions projecting from end surfaces of the stator core in directions along a rotary axis of the stator core, the coil end portions include a plurality of vertex portions projecting outward in the directions along the rotary axis, the vertex portions being provided adjacently to each other in a circumferential direction and a plurality of lead wire portions supplying electric power to the coils, each of the plurality of lead wire portions has a bent corner bent radially outward from radially inward of the stator core, from a radially inward portion of the coil to a radially outward portion of the coil, and end side portions extending toward an end from the bent corner to a position radially outward of the coil, and a bending start point of the bent corner is disposed so as to overlap with the vertex portions as seen from a radial direction and the end side portions are disposed parallel to the end surfaces of the stator core.

* * * * *